US008587141B2

(12) United States Patent
Bjerknes et al.

(10) Patent No.: US 8,587,141 B2
(45) Date of Patent: Nov. 19, 2013

(54) FREQUENCY CONVERTER

(75) Inventors: Ole Johan Bjerknes, Oslo (NO); Hallvard Breistein, Oslo (NO)

(73) Assignee: Aker Engineering & Technology AS, Lysaker (NO)

( * ) Notice: Subject to any disclaimer, the term of this patent is extended or adjusted under 35 U.S.C. 154(b) by 59 days.

(21) Appl. No.: 13/130,359

(22) PCT Filed: Nov. 24, 2009

(86) PCT No.: PCT/EP2009/065738
§ 371 (c)(1),
(2), (4) Date: May 20, 2011

(87) PCT Pub. No.: WO2010/058028
PCT Pub. Date: May 27, 2010

(65) Prior Publication Data
US 2012/0126628 A1 May 24, 2012

(30) Foreign Application Priority Data

Nov. 24, 2008 (NO) .................................. 20084921

(51) Int. Cl.
*H02M 5/02* (2006.01)
*H02J 3/00* (2006.01)

(52) U.S. Cl.
USPC ............................................. 290/44; 307/84

(58) Field of Classification Search
USPC ............................................. 307/84; 363/157
See application file for complete search history.

(56) References Cited

U.S. PATENT DOCUMENTS

| 6,014,323 | A | 1/2000 | Aiello et al. | |
| 6,781,276 | B1 * | 8/2004 | Stiesdal et al. | 310/254.1 |
| 7,042,110 | B2 * | 5/2006 | Mikhail et al. | 290/44 |
| 2004/0119292 | A1 | 6/2004 | Datta et al. | |
| 2005/0012339 | A1 | 1/2005 | Mikhail et al. | |
| 2006/0044857 | A1 | 3/2006 | Lemak | |
| 2006/0279249 | A1 * | 12/2006 | Rastogi et al. | 318/807 |
| 2007/0153555 | A1 | 7/2007 | Stulz et al. | |
| 2007/0216165 | A1 | 9/2007 | Oohara et al. | |
| 2008/0079400 | A1 | 4/2008 | Lacaze | |
| 2010/0133816 | A1 * | 6/2010 | Abolhassani et al. | 290/44 |

FOREIGN PATENT DOCUMENTS

| CN | 1705211 | 12/2005 |
| CN | 101227153 | 7/2008 |
| DE | 19752241 | 6/1999 |
| EP | 0864748 | 9/1998 |

(Continued)

OTHER PUBLICATIONS

Kanelis, Konstantin, "International Search Report", for PCT/EP2009/065738 as mailed May 31, 2010, 4 pages.

*Primary Examiner* — Tulsidas C Patel
*Assistant Examiner* — Sean Gugger
(74) *Attorney, Agent, or Firm* — Winstead PC

(57) ABSTRACT

The inventions relates to a system for conditioning of power from a turbine, the turbine comprising at least one turbine blade (1) connected to a rotating hub (2), the rotating hub (2) is arranged to drive a generator (5). The generator is a multi pole synchronous generator (5) connected via a plurality of galvanic isolated three-phase cables (11) to a multi level frequency converter (25), the generator (5) also being arranged to feed current to the frequency converter (25) through the three-phase cables (11). The multi level frequency converter (25) is constituted by a plurality of elements arranged in columns and coupled in cascading order to add inverted voltage.

20 Claims, 21 Drawing Sheets

(56) References Cited

FOREIGN PATENT DOCUMENTS

| | | |
|---|---|---|
| EP | 1416604 | 5/2004 |
| EP | 1908163 | 4/2008 |
| EP | 1909371 A2 | 4/2008 |
| EP | 1968180 | 9/2008 |
| EP | 1993184 | 11/2008 |
| JP | 2004153910 | 5/2004 |
| WO | WO-84/03400 | 8/1984 |
| WO | WO-99/29025 | 6/1999 |
| WO | WO-00/60719 | 10/2000 |
| WO | WO-00/74198 | 12/2000 |
| WO | WO 0074198 A1 * | 12/2000 |
| WO | WO-2007/003183 | 1/2007 |

* cited by examiner

| Pole Pairs | Poles | Speed 5Hz | Speed 10Hz | Speed 20Hz | Speed 30Hz | Speed 40Hz | Speed 50Hz | Speed 60Hz | Speed 100Hz | Speed 150Hz | Speed 200Hz |
|---|---|---|---|---|---|---|---|---|---|---|---|
| 1 | 2 | 300,0 | 600,0 | 1 200,0 | 1 800,0 | 2 400,0 | 3 000,0 | 3 600,0 | 6 000,0 | 9 000,0 | 12 000,0 |
| 2 | 4 | 150,0 | 300,0 | 600,0 | 900,0 | 1 200,0 | 1 500,0 | 1 800,0 | 3 000,0 | 4 500,0 | 6 000,0 |
| 3 | 6 | 100,0 | 200,0 | 400,0 | 600,0 | 800,0 | 1 000,0 | 1 200,0 | 2 000,0 | 3 000,0 | 4 000,0 |
| 4 | 8 | 75,0 | 150,0 | 300,0 | 450,0 | 600,0 | 750,0 | 900,0 | 1 500,0 | 2 250,0 | 3 000,0 |
| 5 | 10 | 60,0 | 120,0 | 240,0 | 360,0 | 480,0 | 600,0 | 720,0 | 1 200,0 | 1 800,0 | 2 400,0 |
| 6 | 12 | 50,0 | 100,0 | 200,0 | 300,0 | 400,0 | 500,0 | 600,0 | 1 000,0 | 1 500,0 | 2 000,0 |
| 7 | 14 | 42,9 | 85,7 | 171,4 | 257,1 | 342,9 | 428,6 | 514,3 | 857,1 | 1 285,7 | 1 714,3 |
| 8 | 16 | 37,5 | 75,0 | 150,0 | 225,0 | 300,0 | 375,0 | 450,0 | 750,0 | 1 125,0 | 1 500,0 |
| 9 | 18 | 33,3 | 66,7 | 133,3 | 200,0 | 266,7 | 333,3 | 400,0 | 666,7 | 1 000,0 | 1 333,3 |
| 10 | 20 | 30,0 | 60,0 | 120,0 | 180,0 | 240,0 | 300,0 | 360,0 | 600,0 | 900,0 | 1 200,0 |
| 11 | 22 | 27,3 | 54,5 | 109,1 | 163,6 | 218,2 | 272,7 | 327,3 | 545,5 | 818,2 | 1 090,9 |
| 12 | 24 | 25,0 | 50,0 | 100,0 | 150,0 | 200,0 | 250,0 | 300,0 | 500,0 | 750,0 | 1 000,0 |
| 13 | 26 | 23,1 | 46,2 | 92,3 | 138,5 | 184,6 | 230,8 | 276,9 | 461,5 | 692,3 | 923,1 |
| 14 | 28 | 21,4 | 42,9 | 85,7 | 128,6 | 171,4 | 214,3 | 257,1 | 428,6 | 642,9 | 857,1 |
| 15 | 30 | 20,0 | 40,0 | 80,0 | 120,0 | 160,0 | 200,0 | 240,0 | 400,0 | 600,0 | 800,0 |
| 16 | 32 | 18,8 | 37,5 | 75,0 | 112,5 | 150,0 | 187,5 | 225,0 | 375,0 | 562,5 | 750,0 |
| 17 | 34 | 17,6 | 35,3 | 70,6 | 105,9 | 141,2 | 176,5 | 211,8 | 352,9 | 529,4 | 705,9 |
| 18 | 36 | 16,7 | 33,3 | 66,7 | 100,0 | 133,3 | 166,7 | 200,0 | 333,3 | 500,0 | 666,7 |
| 19 | 38 | 15,8 | 31,6 | 63,2 | 94,7 | 126,3 | 157,9 | 189,5 | 315,8 | 473,7 | 631,6 |
| 20 | 40 | 15,0 | 30,0 | 60,0 | 90,0 | 120,0 | 150,0 | 180,0 | 300,0 | 450,0 | 600,0 |
| 21 | 42 | 14,3 | 28,6 | 57,1 | 85,7 | 114,3 | 142,9 | 171,4 | 285,7 | 428,6 | 571,4 |
| 22 | 44 | 13,6 | 27,3 | 54,5 | 81,8 | 109,1 | 136,4 | 163,6 | 272,7 | 409,1 | 545,5 |
| 23 | 46 | 13,0 | 26,1 | 52,2 | 78,3 | 104,3 | 130,4 | 156,5 | 260,9 | 391,3 | 521,7 |
| 24 | 48 | 12,5 | 25,0 | 50,0 | 75,0 | 100,0 | 125,0 | 150,0 | 250,0 | 375,0 | 500,0 |
| 25 | 50 | 12,0 | 24,0 | 48,0 | 72,0 | 96,0 | 120,0 | 144,0 | 240,0 | 360,0 | 480,0 |
| 26 | 52 | 11,5 | 23,1 | 46,2 | 69,2 | 92,3 | 115,4 | 138,5 | 230,8 | 346,2 | 461,5 |
| 27 | 54 | 11,1 | 22,2 | 44,4 | 66,7 | 88,9 | 111,1 | 133,3 | 222,2 | 333,3 | 444,4 |
| 28 | 56 | 10,7 | 21,4 | 42,9 | 64,3 | 85,7 | 107,1 | 128,6 | 214,3 | 321,4 | 428,6 |
| 29 | 58 | 10,3 | 20,7 | 41,4 | 62,1 | 82,8 | 103,4 | 124,1 | 206,9 | 310,3 | 413,8 |
| 30 | 60 | 10,0 | 20,0 | 40,0 | 60,0 | 80,0 | 100,0 | 120,0 | 200,0 | 300,0 | 400,0 |
| 31 | 62 | 9,7 | 19,4 | 38,7 | 58,1 | 77,4 | 96,8 | 116,1 | 193,5 | 290,3 | 387,1 |
| 32 | 64 | 9,4 | 18,8 | 37,5 | 56,3 | 75,0 | 93,8 | 112,5 | 187,5 | 281,3 | 375,0 |
| 33 | 66 | 9,1 | 18,2 | 36,4 | 54,5 | 72,7 | 90,9 | 109,1 | 181,8 | 272,7 | 363,6 |
| 34 | 68 | 8,8 | 17,6 | 35,3 | 52,9 | 70,6 | 88,2 | 105,9 | 176,5 | 264,7 | 352,9 |
| 35 | 70 | 8,6 | 17,1 | 34,3 | 51,4 | 68,6 | 85,7 | 102,9 | 171,4 | 257,1 | 342,9 |
| 36 | 72 | 8,3 | 16,7 | 33,3 | 50,0 | 66,7 | 83,3 | 100,0 | 166,7 | 250,0 | 333,3 |
| 37 | 74 | 8,1 | 16,2 | 32,4 | 48,6 | 64,9 | 81,1 | 97,3 | 162,2 | 243,2 | 324,3 |
| 38 | 76 | 7,9 | 15,8 | 31,6 | 47,4 | 63,2 | 78,9 | 94,7 | 157,9 | 236,8 | 315,8 |
| 39 | 78 | 7,7 | 15,4 | 30,8 | 46,2 | 61,5 | 76,9 | 92,3 | 153,8 | 230,8 | 307,7 |
| 40 | 80 | 7,5 | 15,0 | 30,0 | 45,0 | 60,0 | 75,0 | 90,0 | 150,0 | 225,0 | 300,0 |
| 41 | 82 | 7,3 | 14,6 | 29,3 | 43,9 | 58,5 | 73,2 | 87,8 | 146,3 | 219,5 | 292,7 |
| 42 | 84 | 7,1 | 14,3 | 28,6 | 42,9 | 57,1 | 71,4 | 85,7 | 142,9 | 214,3 | 285,7 |
| 43 | 86 | 7,0 | 14,0 | 27,9 | 41,9 | 55,8 | 69,8 | 83,7 | 139,5 | 209,3 | 279,1 |
| 44 | 88 | 6,8 | 13,6 | 27,3 | 40,9 | 54,5 | 68,2 | 81,8 | 136,4 | 204,5 | 272,7 |
| 45 | 90 | 6,7 | 13,3 | 26,7 | 40,0 | 53,3 | 66,7 | 80,0 | 133,3 | 200,0 | 266,7 |
| 46 | 92 | 6,5 | 13,0 | 26,1 | 39,1 | 52,2 | 65,2 | 78,3 | 130,4 | 195,7 | 260,9 |
| 47 | 94 | 6,4 | 12,8 | 25,5 | 38,3 | 51,1 | 63,8 | 76,6 | 127,7 | 191,5 | 255,3 |
| 48 | 96 | 6,3 | 12,5 | 25,0 | 37,5 | 50,0 | 62,5 | 75,0 | 125,0 | 187,5 | 250,0 |
| 49 | 98 | 6,1 | 12,2 | 24,5 | 36,7 | 49,0 | 61,2 | 73,5 | 122,4 | 183,7 | 244,9 |
| 50 | 100 | 6,0 | 12,0 | 24,0 | 36,0 | 48,0 | 60,0 | 72,0 | 120,0 | 180,0 | 240,0 |
| 51 | 102 | 5,9 | 11,8 | 23,5 | 35,3 | 47,1 | 58,8 | 70,6 | 117,6 | 176,5 | 235,3 |
| 52 | 104 | 5,8 | 11,5 | 23,1 | 34,6 | 46,2 | 57,7 | 69,2 | 115,4 | 173,1 | 230,8 |
| 53 | 106 | 5,7 | 11,3 | 22,6 | 34,0 | 45,3 | 56,6 | 67,9 | 113,2 | 169,8 | 226,4 |
| 54 | 108 | 5,6 | 11,1 | 22,2 | 33,3 | 44,4 | 55,6 | 66,7 | 111,1 | 166,7 | 222,2 |
| 55 | 110 | 5,5 | 10,9 | 21,8 | 32,7 | 43,6 | 54,5 | 65,5 | 109,1 | 163,6 | 218,2 |
| 56 | 112 | 5,4 | 10,7 | 21,4 | 32,1 | 42,9 | 53,6 | 64,3 | 107,1 | 160,7 | 214,3 |
| 57 | 114 | 5,3 | 10,5 | 21,1 | 31,6 | 42,1 | 52,6 | 63,2 | 105,3 | 157,9 | 210,5 |
| 58 | 116 | 5,2 | 10,3 | 20,7 | 31,0 | 41,4 | 51,7 | 62,1 | 103,4 | 155,2 | 206,9 |
| 59 | 118 | 5,1 | 10,2 | 20,3 | 30,5 | 40,7 | 50,8 | 61,0 | 101,7 | 152,5 | 203,4 |
| 60 | 120 | 5,0 | 10,0 | 20,0 | 30,0 | 40,0 | 50,0 | 60,0 | 100,0 | 150,0 | 200,0 |
| 61 | 122 | 4,9 | 9,8 | 19,7 | 29,5 | 39,3 | 49,2 | 59,0 | 98,4 | 147,5 | 196,7 |
| 62 | 124 | 4,8 | 9,7 | 19,4 | 29,0 | 38,7 | 48,4 | 58,1 | 96,8 | 145,2 | 193,5 |
| 63 | 126 | 4,8 | 9,5 | 19,0 | 28,6 | 38,1 | 47,6 | 57,1 | 95,2 | 142,9 | 190,5 |
| 64 | 128 | 4,7 | 9,4 | 18,8 | 28,1 | 37,5 | 46,9 | 56,3 | 93,8 | 140,6 | 187,5 |
| 65 | 130 | 4,6 | 9,2 | 18,5 | 27,7 | 36,9 | 46,2 | 55,4 | 92,3 | 138,5 | 184,6 |
| 66 | 132 | 4,5 | 9,1 | 18,2 | 27,3 | 36,4 | 45,5 | 54,5 | 90,9 | 136,4 | 181,8 |
| 67 | 134 | 4,5 | 9,0 | 17,9 | 26,9 | 35,8 | 44,8 | 53,7 | 89,6 | 134,3 | 179,1 |
| 68 | 136 | 4,4 | 8,8 | 17,6 | 26,5 | 35,3 | 44,1 | 52,9 | 88,2 | 132,4 | 176,5 |
| 69 | 138 | 4,3 | 8,7 | 17,4 | 26,1 | 34,8 | 43,5 | 52,2 | 87,0 | 130,4 | 173,9 |
| 70 | 140 | 4,3 | 8,6 | 17,1 | 25,7 | 34,3 | 42,9 | 51,4 | 85,7 | 128,6 | 171,4 |
| 71 | 142 | 4,2 | 8,5 | 16,9 | 25,4 | 33,8 | 42,3 | 50,7 | 84,5 | 126,8 | 169,0 |
| 72 | 144 | 4,2 | 8,3 | 16,7 | 25,0 | 33,3 | 41,7 | 50,0 | 83,3 | 125,0 | 166,7 |
| 73 | 146 | 4,1 | 8,2 | 16,4 | 24,7 | 32,9 | 41,1 | 49,3 | 82,2 | 123,3 | 164,4 |
| 74 | 148 | 4,1 | 8,1 | 16,2 | 24,3 | 32,4 | 40,5 | 48,6 | 81,1 | 121,6 | 162,2 |
| 75 | 150 | 4,0 | 8,0 | 16,0 | 24,0 | 32,0 | 40,0 | 48,0 | 80,0 | 120,0 | 160,0 |
| 76 | 152 | 3,9 | 7,9 | 15,8 | 23,7 | 31,6 | 39,5 | 47,4 | 78,9 | 118,4 | 157,9 |
| 77 | 154 | 3,9 | 7,8 | 15,6 | 23,4 | 31,2 | 39,0 | 46,8 | 77,9 | 116,9 | 155,8 |
| 78 | 156 | 3,8 | 7,7 | 15,4 | 23,1 | 30,8 | 38,5 | 46,2 | 76,9 | 115,4 | 153,8 |
| 79 | 158 | 3,8 | 7,6 | 15,2 | 22,8 | 30,4 | 38,0 | 45,6 | 75,9 | 113,9 | 151,9 |
| 80 | 160 | 3,8 | 7,5 | 15,0 | 22,5 | 30,0 | 37,5 | 45,0 | 75,0 | 112,5 | 150,0 |
| 81 | 162 | 3,7 | 7,4 | 14,8 | 22,2 | 29,6 | 37,0 | 44,4 | 74,1 | 111,1 | 148,1 |
| 82 | 164 | 3,7 | 7,3 | 14,6 | 22,0 | 29,3 | 36,6 | 43,9 | 73,2 | 109,8 | 146,3 |
| 83 | 166 | 3,6 | 7,2 | 14,5 | 21,7 | 28,9 | 36,1 | 43,4 | 72,3 | 108,4 | 144,6 |
| 84 | 168 | 3,6 | 7,1 | 14,3 | 21,4 | 28,6 | 35,7 | 42,9 | 71,4 | 107,1 | 142,9 |
| 85 | 170 | 3,5 | 7,1 | 14,1 | 21,2 | 28,2 | 35,3 | 42,4 | 70,6 | 105,9 | 141,2 |
| 86 | 172 | 3,5 | 7,0 | 14,0 | 20,9 | 27,9 | 34,9 | 41,9 | 69,8 | 104,7 | 139,5 |
| 87 | 174 | 3,4 | 6,9 | 13,8 | 20,7 | 27,6 | 34,5 | 41,4 | 69,0 | 103,4 | 137,9 |
| 88 | 176 | 3,4 | 6,8 | 13,6 | 20,5 | 27,3 | 34,1 | 40,9 | 68,2 | 102,3 | 136,4 |
| 89 | 178 | 3,4 | 6,7 | 13,5 | 20,2 | 27,0 | 33,7 | 40,4 | 67,4 | 101,1 | 134,8 |
| 90 | 180 | 3,3 | 6,7 | 13,3 | 20,0 | 26,7 | 33,3 | 40,0 | 66,7 | 100,0 | 133,3 |
| 91 | 182 | 3,3 | 6,6 | 13,2 | 19,8 | 26,4 | 33,0 | 39,6 | 65,9 | 98,9 | 131,9 |
| 92 | 184 | 3,3 | 6,5 | 13,0 | 19,6 | 26,1 | 32,6 | 39,1 | 65,2 | 97,8 | 130,4 |
| 93 | 186 | 3,2 | 6,5 | 12,9 | 19,4 | 25,8 | 32,3 | 38,7 | 64,5 | 96,8 | 129,0 |
| 94 | 188 | 3,2 | 6,4 | 12,8 | 19,1 | 25,5 | 31,9 | 38,3 | 63,8 | 95,7 | 127,7 |
| 95 | 190 | 3,2 | 6,3 | 12,6 | 18,9 | 25,3 | 31,6 | 37,9 | 63,2 | 94,7 | 126,3 |
| 96 | 192 | 3,1 | 6,3 | 12,5 | 18,8 | 25,0 | 31,3 | 37,5 | 62,5 | 93,8 | 125,0 |
| 97 | 194 | 3,1 | 6,2 | 12,4 | 18,6 | 24,7 | 30,9 | 37,1 | 61,9 | 92,8 | 123,7 |
| 98 | 196 | 3,1 | 6,1 | 12,2 | 18,4 | 24,5 | 30,6 | 36,7 | 61,2 | 91,8 | 122,4 |
| 99 | 198 | 3,0 | 6,1 | 12,1 | 18,2 | 24,2 | 30,3 | 36,4 | 60,6 | 90,9 | 121,2 |
| 100 | 200 | 3,0 | 6,0 | 12,0 | 18,0 | 24,0 | 30,0 | 36,0 | 60,0 | 90,0 | 120,0 |
| 101 | 202 | 3,0 | 5,9 | 11,9 | 17,8 | 23,8 | 29,7 | 35,6 | 59,4 | 89,1 | 118,8 |

Fig. 15

FREQUENCY CONVERTER

FIELD OF THE INVENTION

This invention relates generally to a frequency converter associated with a turbine. More particularly, this invention relates to the conditioning of power from a variable speed turbine, for example a wind turbine, connected to a separately excited- or permanent magnet synchronous machine.

BACKGROUND OF THE INVENTION AND PRIOR ART

As fossil energy sources reaches their peak production and their availability decline, need for renewable energy increases in pace with mankind's ever increasing consumption. Easily available sources of renewable energy have, to a large extent, already been developed as with fossil sources. This is true, especially for hydro power. In other words, the need is for new renewable energy sources, such as wind-, solar-, tidal- or wave power. A common feature for these sources of energy is that they are inherently periodical or unpredictable, as tidal flows and perhaps solar radiation, costly in development and sometimes volatile.

Of the above mentioned renewable energy sources, wind power has so far proven to be the most potentially competitive. It is, however, burdened with large installation costs and low output. The trend is therefore towards higher power ratings of each individual wind turbine, in order to maximize the production, and hence the earnings, of the installation. As the maximum theoretical power of a wind turbine is proportional to the circular area formed by its wing tips, the power of a wind mill is proportional to its physical size. This leads to structural challenges related to placing large and heavy components on the top of a tall structure, experiencing formidable thrust from stiff winds. Also, the amount of available space within a wind mill nacelle is limited. Wind turbines can be placed on shore or off shore. Recently, the focus for research and development has turned towards offshore wind turbines.

Another challenge related to wind power is the unpredictability associated with wind speed. Most variable speed wind turbines common today has a required wind speed of 2-4 m/s, a maximum production wind speed of 12-16 m/s, and a cut out speed in the range 25 m/s. This wide range of operating conditions necessitates the use of some sort of power conditioning unit between the power grid and the generator. This is, as is obvious to a person skilled in the art, because a synchronous generator linked directly to a power grid operating at, for example, 50 Hz would only be able to rotate at 3000, 1500, 1000, 750 rpm, etc. depending on its construction—ref. FIG. 15 that also include some other frequency and speed alternatives. A common way of turbine drive wind speed adaptation is described in the patent application no.: EP1908163A1, by the company Vestas Wind Systems. A frequency converter is situated between the grid transformer and the generator, with its controlled frequency side at the generator side. This solution enables speed control of the machine in what is known as regenerative breaking: the wind tries to rotate the generator rotor faster than the speed corresponding to the applied controlled frequency, inducing currents that are fed through the converter and into the grid via a DC-link and an inverter. If the torque from the blades becomes too large for the machine, the converter may increase the frequency and hence the rotor speed.

EP1416604A2 discloses and electric circuit for a wind mill. This electric circuit includes a driven generator with rotor and stator. The stator of the generator is divided into separate sections, and each section is connected to independent parallel rectifier circuits and. Each rectifier circuit is connected to an independent direct current circuit, which in turn is connected to the input of at least one independent inverter. In the end, the outputs of the independent inverters are connected to a supply network. The sectioning of the stator and the independent rectifiers and inverters provides a system with redundancy, which makes it possible to perform maintenance on the electric circuit without having to shut down the whole operation of the wind mill, and also provides greater reliability.

Frequency converters are well known to those skilled in the art and they exist in a number of varieties and topologies with different characteristics, advantages and disadvantages. One such frequency converter is the Siemens patented "Perfect harmony series" illustrated in FIG. 1. It is characterised by containing individual power cells 8 containing a three-phase rectifier 6 and a one-phase pulse width modulated inverter 7. The power cells are then connected in series to form the output of one of the resulting phases as shown in FIG. 1. Each column of series connected power cells 8 are 120° phase shifted, and the resulting quite smooth three-phase AC drives a synchronous- or asynchronous machine 9. The frequency converter 25 is fed from an isolation transformer 10 with one or more multiples of three to five legs. In the case of FIG. 1, it has 12 three phase "low voltage" windings divided into four groups consisting of individual three-phase connections to the diode rectifiers of three segregated power cells. The 12 three phase "low voltage" windings shown in FIG. 1, have different phase shift in order to provide a "Clean Power Input" The pulse width modulation of the power cell groups are typically phase shifted by some degrees in order to limit harmonic content on the resulting composite for the three-phase output.

Another example of a frequency converter is ABB's ACS 5000 which was developed to meet the requirements of the growing number of applications driven by standard motors up to 6.9 kV. This type of frequency converter is illustrated in FIG. 2 and comprises an optionally integrated input transformer 15 connected to a main converter part. The main converter part comprises a diode rectifier 6, a DC-link capacitor 16 and an inverter 7 connected in series and connected to a motor. The motor can be an induction- or a synchronous motor with permanent magnets or field windings. The inverter 7 is of the voltage source inverter multilevel-fuseless (VSI-MF) topology (9 levels line-to-line) and uses the integrated gate commutated thyristor (IGCT) semi conductor technology. The typical transformer windings phase-shift and diode-rectifiers 6 shown in FIG. 2, all add up to become a 36-puls diode rectifier that minimises harmonics drawn from the grid. Controls 17 are also comprised in the ACS 5000.

Alstom's Multilevel Type Inverter (Typical ALSPA VDM6000) has "Flying Capacitor" inverter topology that utilizes a common intermediate dc-circuit. A higher common intermediate dc-voltage level 26 is achieved by adding dc voltages after rectification as shown in FIG. 7. The voltage is smoothened by a capacitor bank and inverted multiple levels. The VDM has cascaded IGBT modules with diodes in anti parallel to ensure bidirectional power flow. The CDM8000 is a current source inverter of the same family. The CDM utilises GTOs or IGCTs.

In WO 00/60719 a solution is described for providing energy from a turbine, based on a system where coupling to the stator windings are centralized using a common cable. In U.S. Pat. No. 6,014,323 a multi level converter is described being arranged in columns using a common transformer connected to a power source.

When electric power needs to be transported over long distances and overhead lines are unpractical, High Voltage Direct Current (HVDC) is a feasible alternative. FIG. 13 shows a DC-based wind park. Here, the electric output from each turbine is rectified immediately after the initial step up transformer, collected and fed to shore in a common subsea cable. At landfall the power inverted into the power grid. FIG. 14 shows a typical schematic of a HVDC-light or HVDC-plus system. It shows the offshore converter station located either at each wind turbine or acting as a collecting point for several units, the onshore inverter station at landfall and the interconnecting subsea DC-cable.

FIG. 16 shows an alternative DC-based wind park topology.

The previous has given a general presentation of three examples of multilevel inverters. In the following, any kind of suitable multi-level inverter may be used.

OBJECTIVE OF THE INVENTION

It is an object of the present solution to provide a solution that can help satisfying mankind's ever increasing power consumption in an environmental friendly way. It is also an object for the present invention to provide a solution to the problems regarding the large installation costs and low output of today's wind turbines, and also regarding the structural challenges related to placing large and heavy components on the top of a tall structure and the limited amount of available space within a wind turbine nacelle.

The objects of this invention are obtained as described in the accompanying claims.

SHORT SUMMARY OF THE INVENTION

According to the invention there is in a first aspect provided a system for conditioning of power from a turbine. The turbine comprising at least one turbine blade connected to a rotating hub. The rotating hub is arranged to drive a generator.

The generator is a multi pole synchronous generator connected via a plurality of galvanic isolated three-phase cables to a multi level frequency converter 25 or alternativly to a similar multi level rectifier topology for any dc-power interconnections with a common intermediate dc-voltage level 26 suited to interface a converter 7. The generator is arranged to feed current to the frequency converter 25 through the three-phase cables. The multi level frequency converter 25 is constituted by a plurality of elements arranged in columns and coupled in cascading order to add inverted voltage. A transformer is connected to the multi level frequency converter output and arranged to transform the added inverted voltage to a power grid level connected to the transformer secondary side.

In an alternative embodiment of the system according to the present invention the generator has rotor field windings or permanent magnets.

In yet an alternative embodiment of the system according the invention the system is a gearless system.

In another alternative embodiment of the system according to the present invention the system comprises a gear.

In a further alternative embodiment of the system according to the present invention the stator windings of the generator are arranged in a combination of D, Y and/or Z variations.

In still a further alternative embodiment of the system according to the present invention the turbine is a variable speed wind turbine.

In another alternative embodiment of the system according to the present invention the transformer is a standard transformer or a rotating transformer.

In a second aspect of the invention there is provided a wind park comprising at least one self-starting wind turbine and at least one non-self starting wind turbine. The self-starting wind turbine comprising a system for conditioning of power from a wind turbine, the wind turbine comprising at least one turbine blade connected to a rotating hub. The rotating hub is arranged to drive a generator, and the generator is a multi pole synchronous generator connected via a plurality of galvanic isolated three-phase cables to a multi level power converter. The generator is arranged to feed induced current to the multi level frequency converter through the three-phase cables. The multi level frequency converter is constituted by a plurality of elements arranged in columns and coupled in cascading order to add inverted voltage. A transformer is connected to the multi level frequency converter and arranged to transform the added inverted voltage to a power grid level connected to the transformer. The at least one self-starting wind turbine is arranged to start the at least one non-self starting wind turbines by having the AC side towards the power grid.

In alternative embodiment of the wind park according to the second aspect of the invention the generator has rotor field windings or permanent magnets.

In yet an alternative embodiment of the wind park according to the present invention the self-starting wind turbine is gearless.

In still an alternative embodiment of the wind park according to the invention the self-starting wind turbine comprises a gear.

In a further alternative embodiment of the wind park according to the present invention the stator windings of the generator are arranged in a combination of D, Y. and/or Z variations.

In still a further alternative embodiment of the wind park according to the invention the turbine is a variable speed wind turbine.

In another alternative embodiment of the wind park according to the present invention the transformer is a standard transformer or a rotating transformer.

In a third aspect of the invention there is provided a method for starting at least one non-self starting wind turbine with at least one self-starting wind turbine in a wind park according to the second aspect, the at least one self starting wind turbines being connected to emergency power units. The method comprises the following steps:

pitching the at least one blade of the at least one self-starting wind turbine to a start position by using the emergency power unit, releasing a break on the at leas one self-starting wind turbine to rotate the at least one turbine blade, inducing voltages in the stator of the multi level frequency generator as the rotor speed increases by using permanent magnet- or field windings excited by the emergency power unit, starting the multi level frequency converter and adding the induced voltages to build a local grid voltage in the wind park, using the local grid voltage to provide a voltage to the at least one non-self starting wind turbine, pitching the at least one blade of the at least one non self-starting wind turbine to a start position, releasing the at least one break on the non self-starting wind turbine to rotate the at least one turbine blade.

In an alternative embodiment of the method according to the third aspect of the invention the method further comprises the following steps:
building DC-link voltages to operating levels in the self-starting wind turbine,
starting the multi level frequency converter and adding the DC-link voltages to build a local grid voltage in the wind park,
building DC-link voltages to operating levels in the non-self starting wind turbine.

In an alternative future embodiment of the invention the energy storage capacity within the dc-link(s) could be enhanced by energy dense batteries or super capacitors and enable better island-mode operation of a single or some wind turbines, in addition to higher tolerances versus transient power grid events.

BRIEF DESCRIPTION OF THE DRAWINGS

The invention will now be described in more detail with references to the appended drawings wherein:

FIG. 15 illustrates in numeric table form some typical relations between generator speed and frequency versus rotor pole numbers.

DETAILED DESCRIPTION OF THE INVENTION

Figure 1:
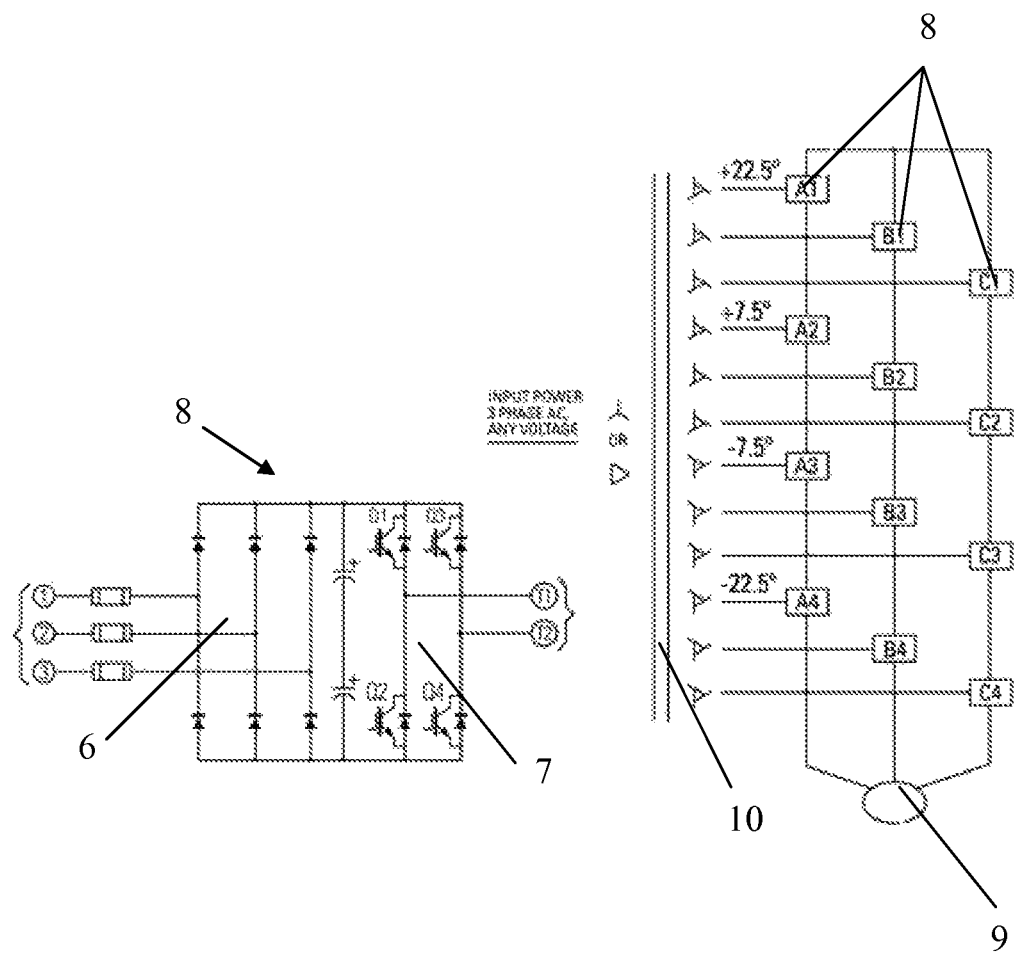
FIG. 1 illustrates a prior art power cell and frequency converter.
Figure 2:
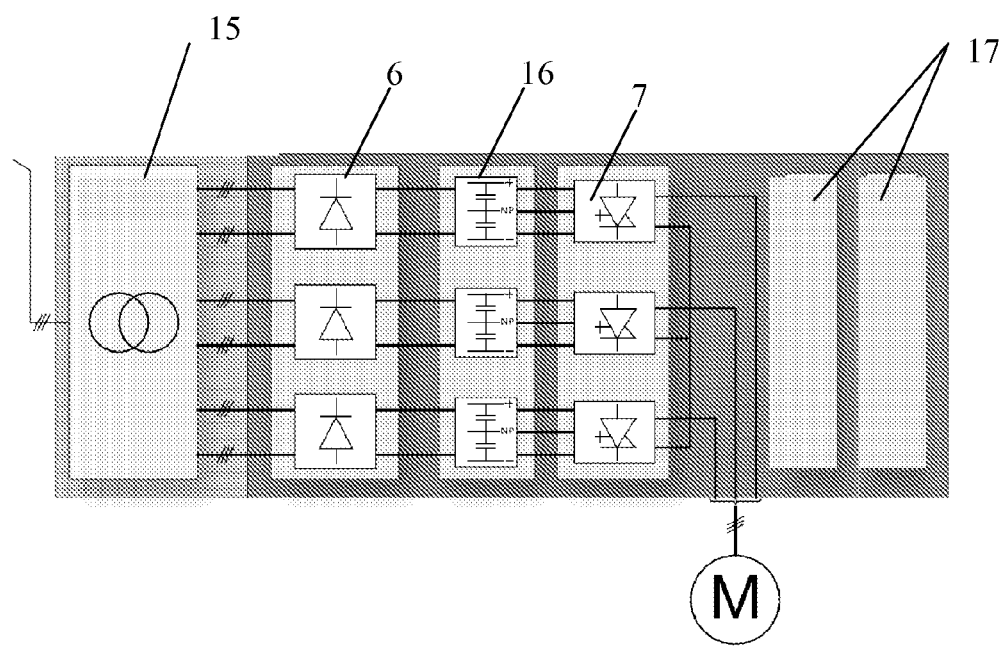
FIG. 2 illustrates a second example of prior art frequency converter.
Figure 3:
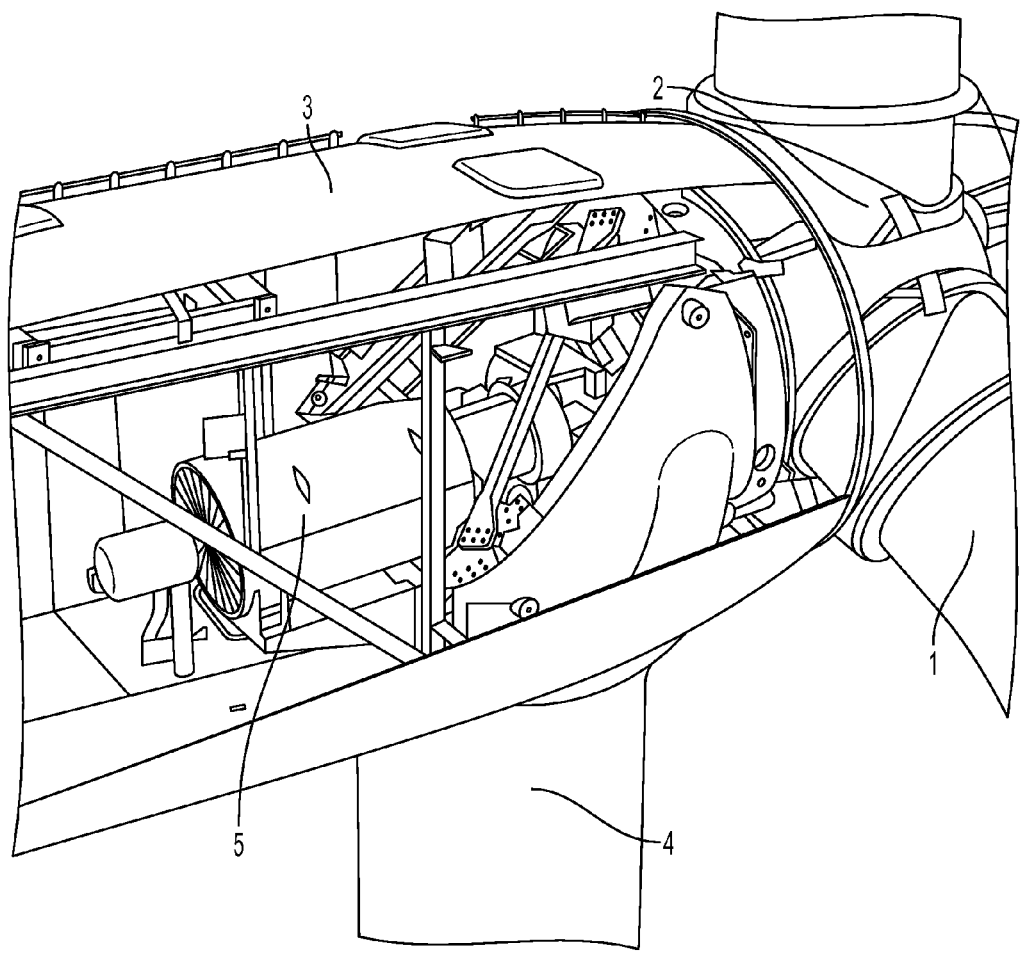
FIG. 3 illustrates an example of application of the invention in a wind turbine.

The system is intended to be connected to a turbine, for example a wind turbine. A typical wind turbine is illustrated in FIG. 3 and comprises at least one turbine blade 1 connected to a rotating hub 2. The hub is connected to a turbine housing/nacelle 3 mounted atop a tower, and the nacelle 3 rotates to face the wind by means of controlled servo motors.

Figure 4:
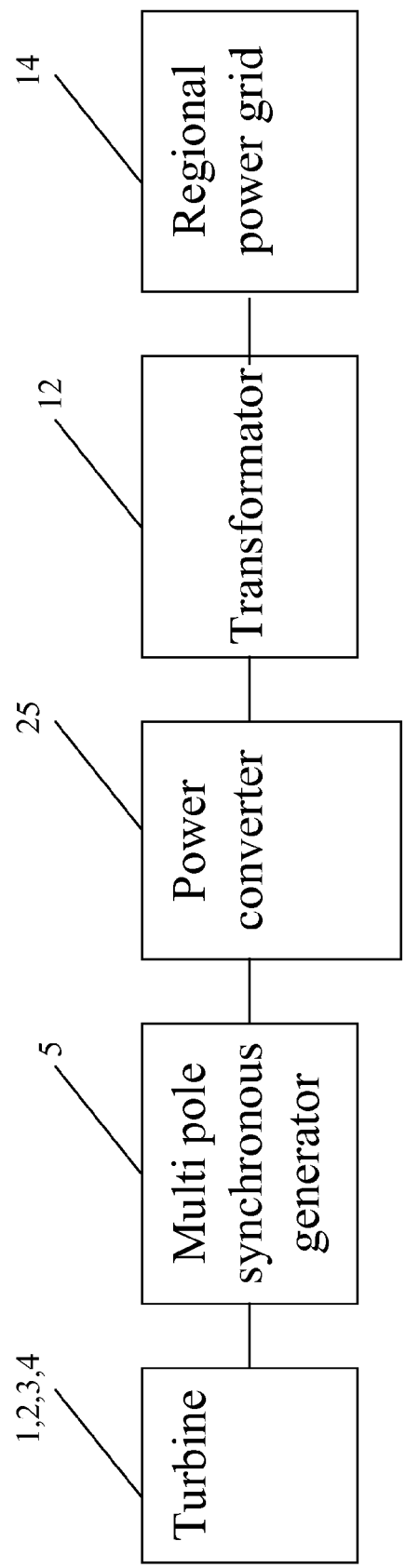
FIG. 4 is a schematic view of the system according to the present invention.

FIG. 4 shows a schematic view of the system according to the present invention. The FIG. 4 shows the main components of the system which comprises the turbine 1, 2, 3, 4 with the rotating hub 2 which drives a multi pole synchronous generator 5 situated in the nacelle 3. The generator 5 can have permanent magnets or rotor field windings. The multi pole generator 5 has galvanic isolated stator windings corresponding to the number of rotor poles and is therefore suited for a frequency converter interface of a type that can add up the voltages from different stator winding groups, which typically will be a multi level frequency converter 25. A multi-level voltage source inverter could give voltages in the 6-7 kV range or higher. A current source inverter interface could also be suitable to add up voltage-levels from segregated stator windings of multi-pole generator drives. A transformer 12 is connected to the frequency converter 25 via an AC cable. This transformer 12 may interface voltages up around the 132 kV range, connecting a wind farm to the regional power grid. The stator segments of the multi pole synchronous generator 5 are connected to different levels of a multi level frequency converter 25, which uses these levels to add and build up a higher voltage.

Figure 5A:
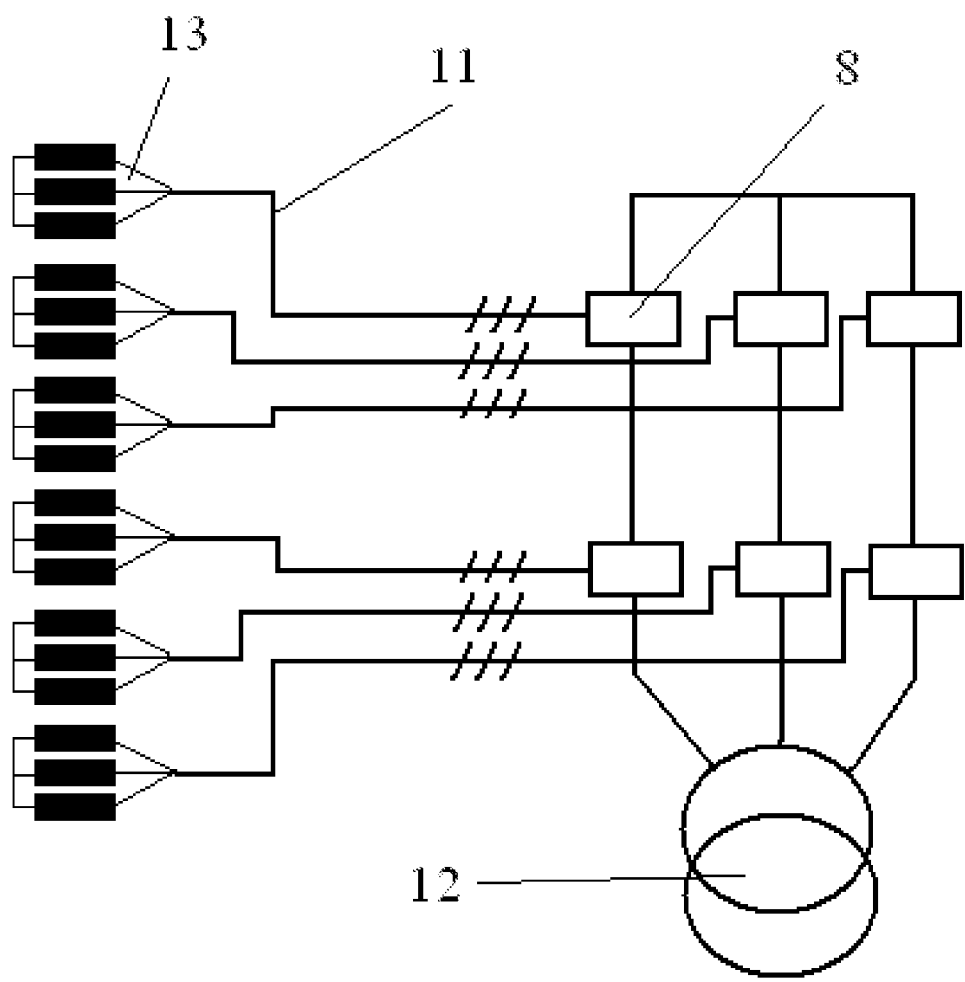
FIG. 5a illustrates a first alternative embodiment of the system according to the present invention where the generator has 12 poles.
Figure 5B:
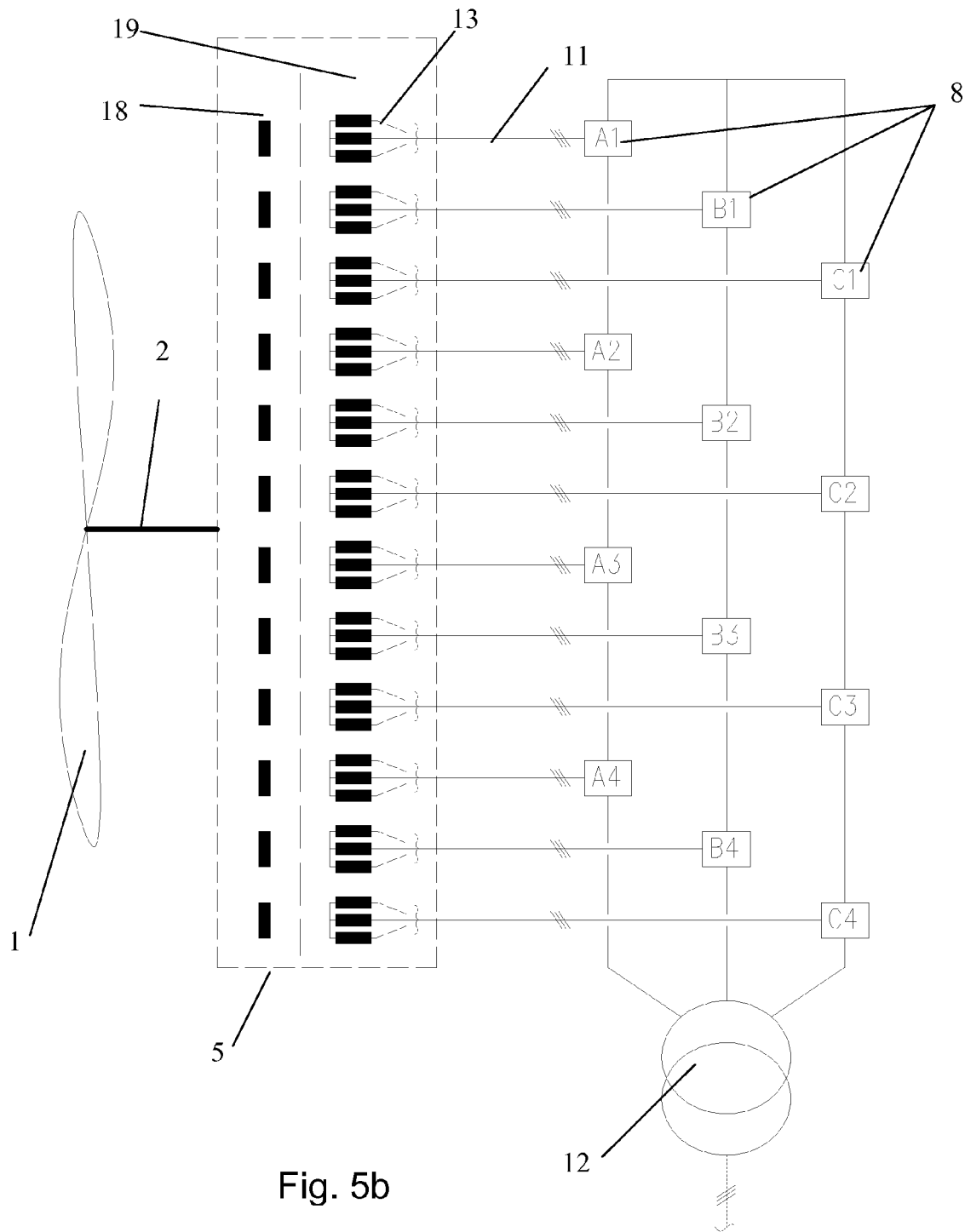
FIG. 5b illustrates the first alternative embodiment of the system where the generator has 24 poles.
Figure 5C:
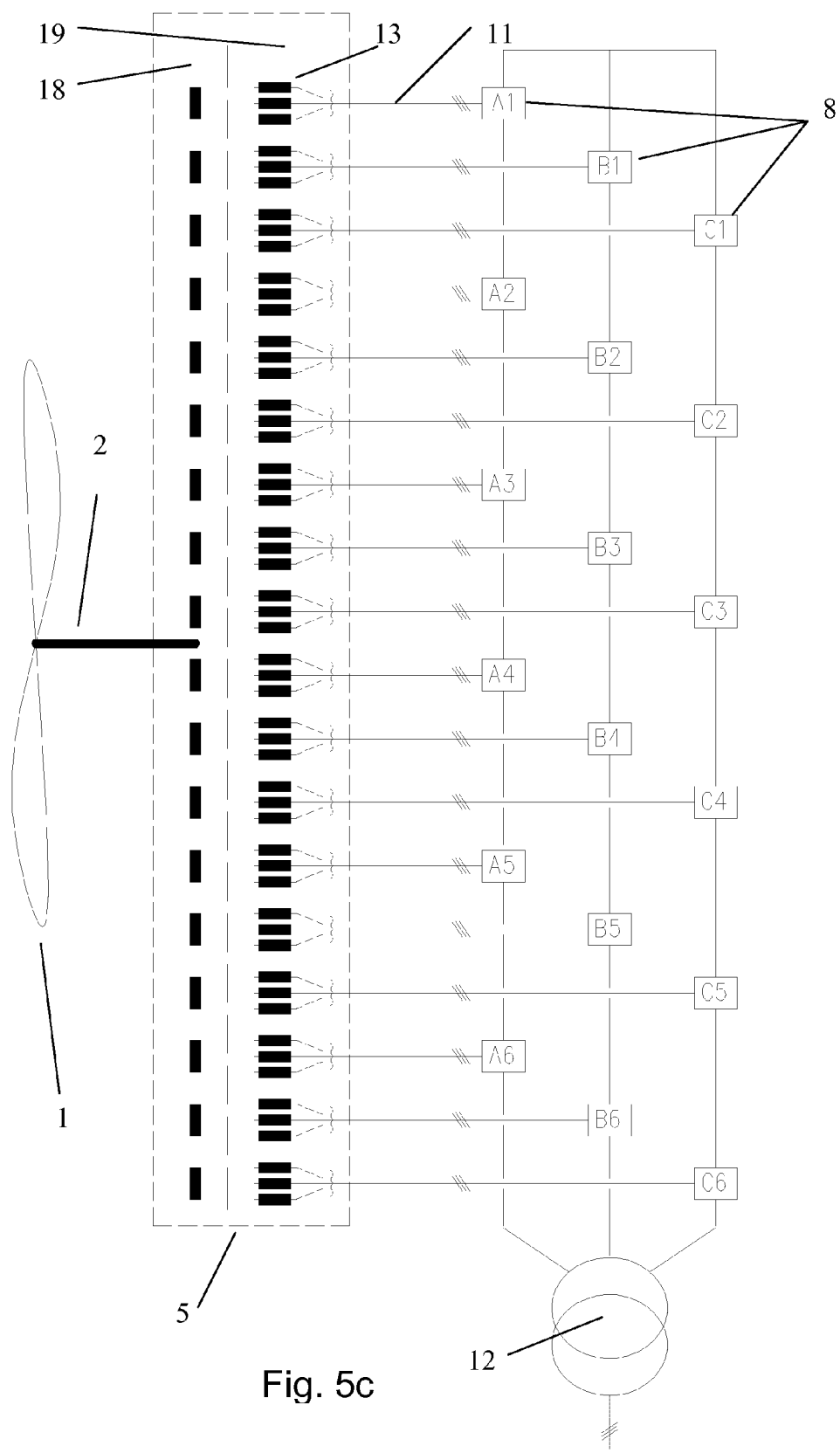
FIG. 5c illustrates the first alternative embodiment of the system where the generator has 36 poles.
Figures 5D, 5E:
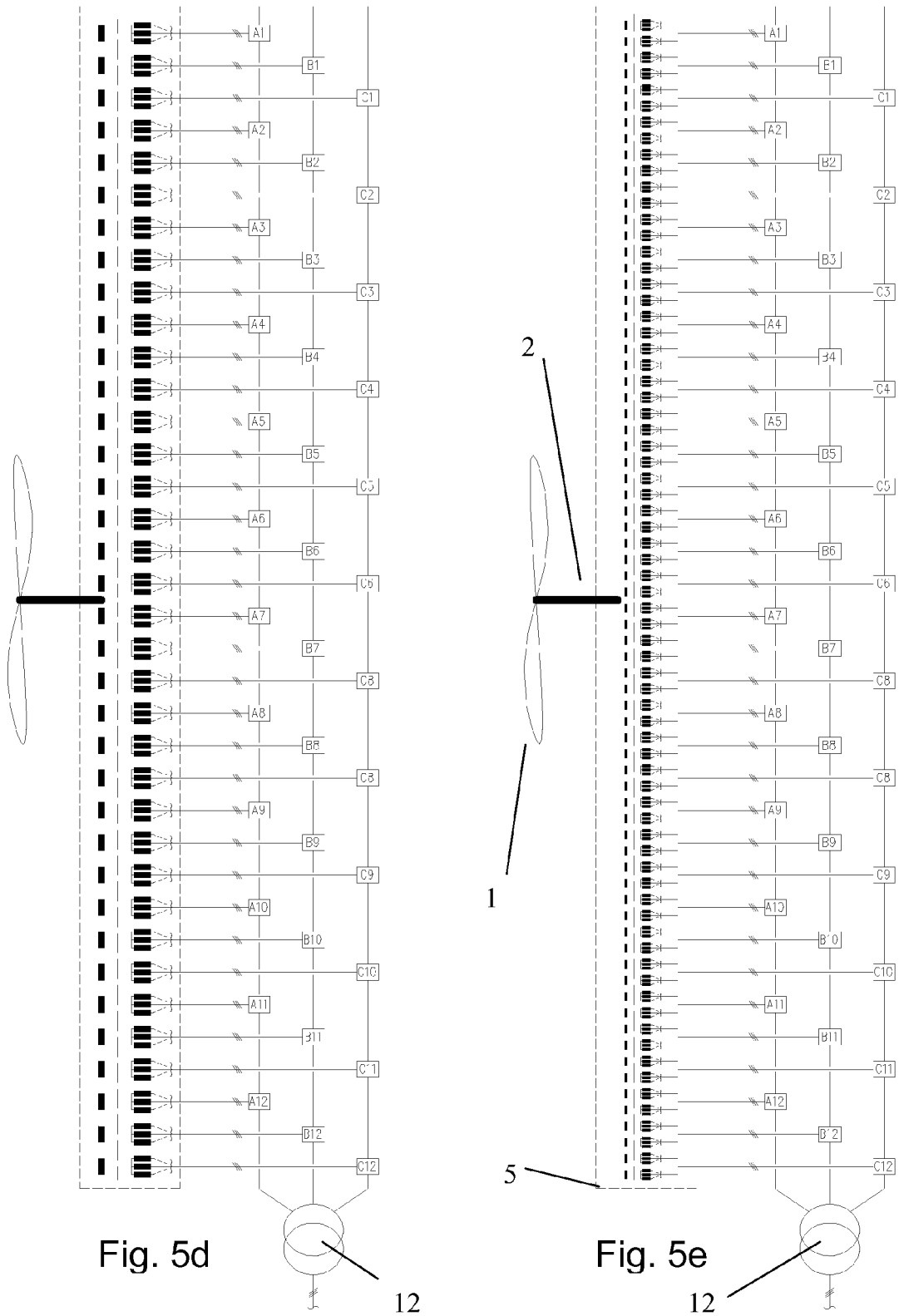
FIG. 5d illustrates the first alternative embodiment of the system where the generator has 72 poles.
FIG. 5e illustrates the first alternative embodiment of the system where the generator has 144 poles and paralleled Y pairs of stator windings.
Figure 5F:
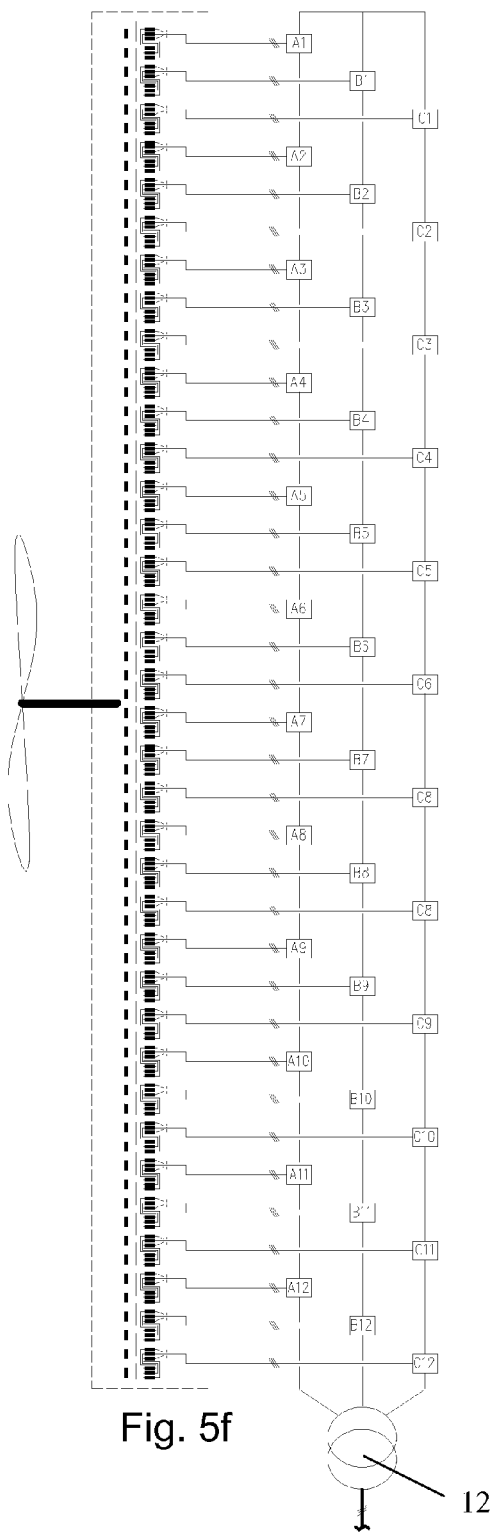
FIG. 5f illustrates the second alternative embodiment of the system where the generator has 144 poles and Y-Y series connected pairs of stator windings.
Figure 5G:
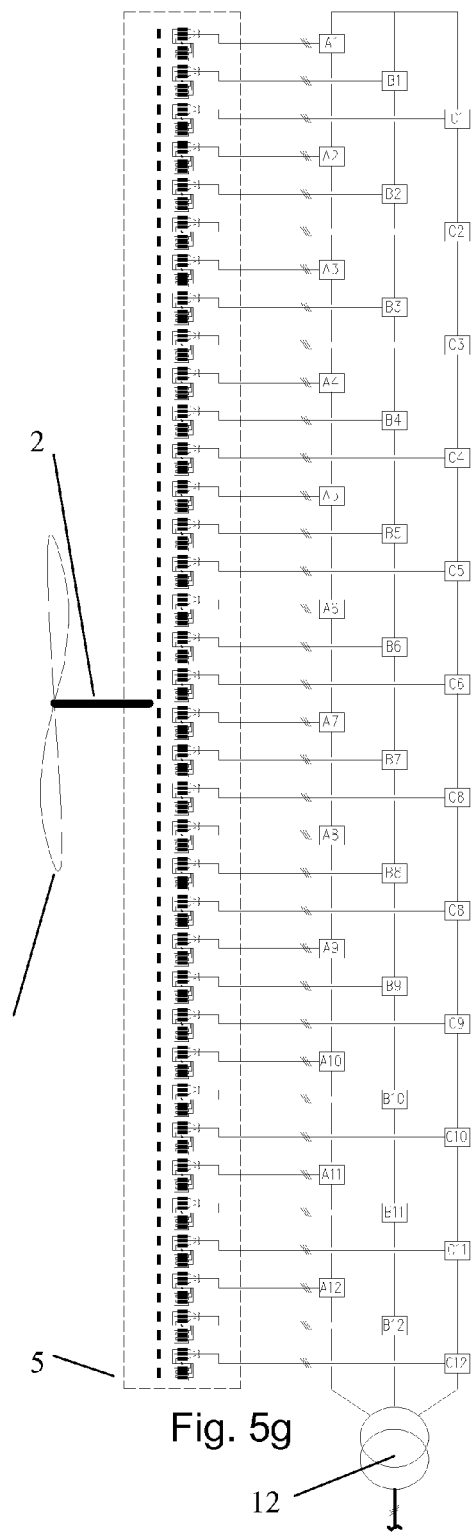
FIG. 5g illustrates the third alternative embodiment of the system where the generator has 144 poles and series connected D-Y pairs of stator windings.
Figure 5H:
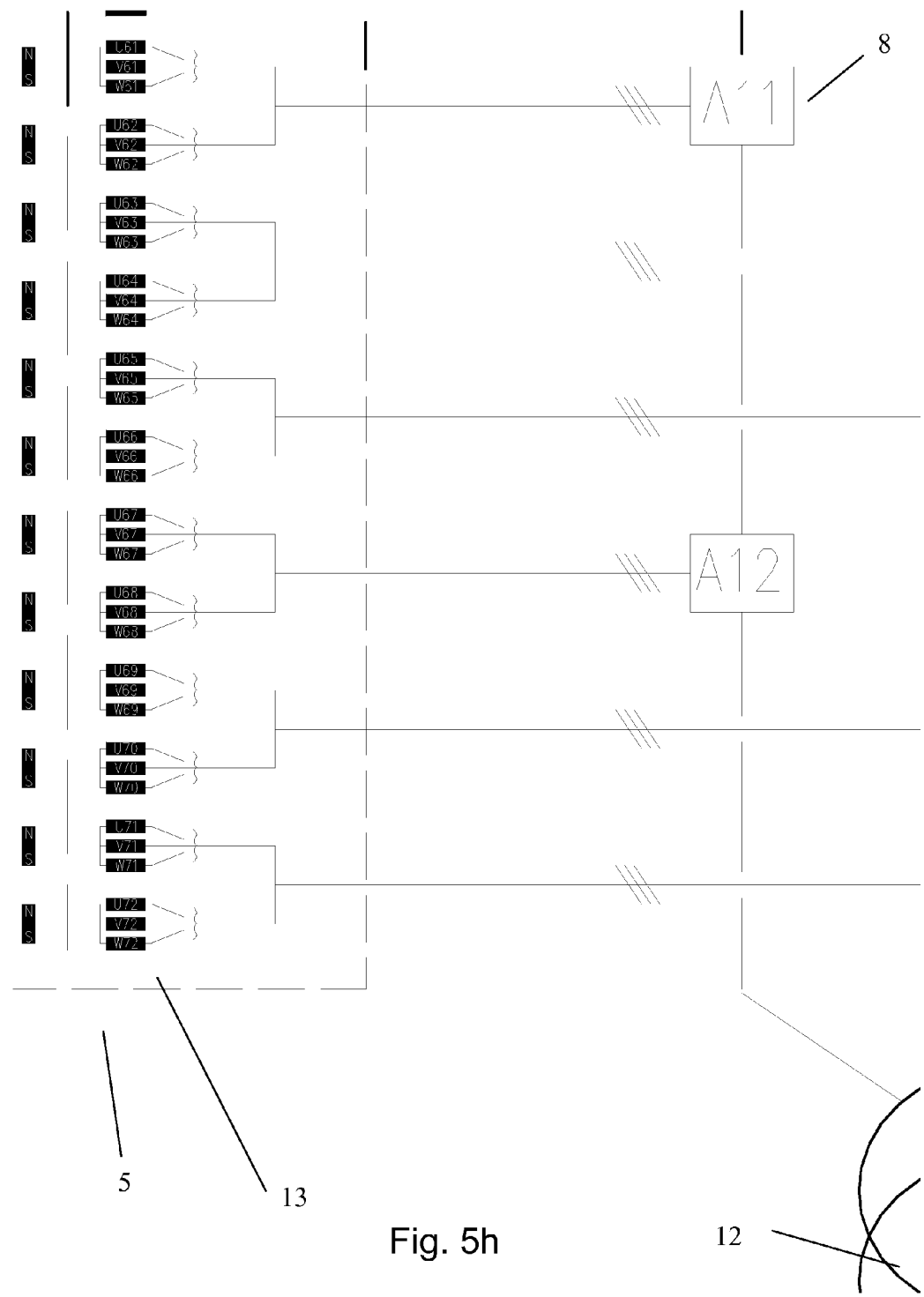
FIG. 5h illustrates typical stator winding identification for an alternative embodiment of the system where the generator has 144 poles and paralleled Y pairs.
Figure 6:
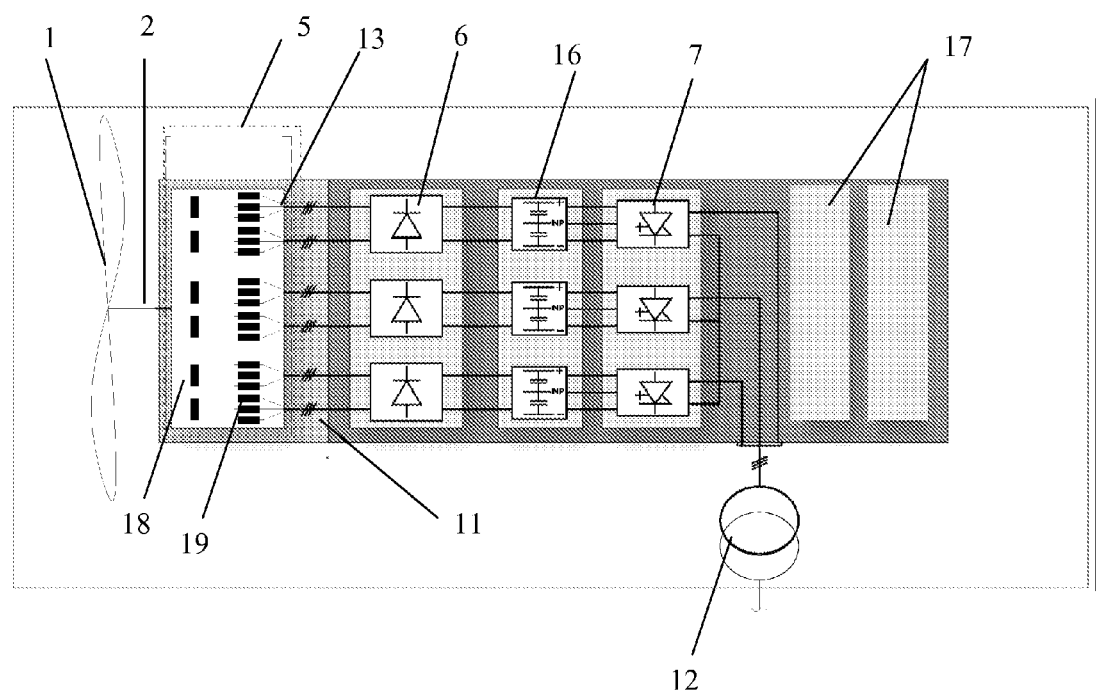
FIG. 6 illustrates a second alternative embodiment of the system (where the generator has 12 poles) according to the present invention.

FIGS. 5 and 6 show two alternative embodiments of the system according to the present invention. The difference between the two alternative embodiments is the topology of the multi level frequency converter 25, which again affects the number of poles on the generator 5. The choice of semiconductor is also different, the ACS 5000 being based on IGCTs and the Perfect harmony on IGBTs.

As shown in FIGS. 5a and 5b, the synchronous generator 5 has galvanic isolated stator windings, and feeds induced current to a multi level frequency converter 25 topology through galvanic isolated three-phase cables 11. For example, if the generator 5 is a 12-pole machine, six sets of three-phase generator-stator windings 13 feed six galvanic isolated three-phase cables 11, that run from the generator 5 to the multi level frequency converter 25, as shown in FIG. 5. Each of these three-phase cables 11 feed one power cell 8 which generates one-phase AC. The power cells 8 are arranged in columns, and are coupled in cascading order to add the one-phase AC voltage. As mentioned above, the power cells 8 comprise a three-phase rectifier 6 and a one-phase pulse width modulated (PWM) inverter 7. The columns of power cells 8 are 120° phase shifted by PWM control and are connected to a common neutral. This way, three columns of single-phase AC is connected together in a transformer or to an AC cable to produce three-phase power for transmission. A power grid interface transformer 14 is connected to the power cells 8 to interface the regional power grid 12.

In the alternative embodiment given in FIG. 5*a*, the generator has 12 poles, however the generator may have an arbitrary even number of poles p corresponding to p/2 sets of three-phase windings, each feeding a power cell 8 through a galvanic isolated three-phase cable 11.

24 poles or 12 pole-pairs give 12 separate three-phase stator windings suitable for a 9-Level Perfect Harmony topology structure for 4160 volt AC output, as shown in FIG. 5*b*, i.e. suitable interface for a generator rated for 250 rpm at 50 Hz. The power grid interface transformer 12 would for this case typically be 22/4.2 kV YNd or Dyn.

36 poles or 18 pole-pairs give 18 separate three-phase stator windings suitable for a 6600-7200 volt Perfect Harmony topology structure, as shown in FIG. 5*c*, i.e. suitable interface for a generator rated for 166.67 rpm at 50 Hz or 200 rpm at 60 Hz. The power grid interface transformer 12 could for this case typically be 22/6.6 kV YNd or Dyn.

72 poles or 36 pole-pairs give 36 separate three-phase stator windings suitable for a 11000-13800 volt Perfect Harmony topology structure, as shown in FIG. 5*d*, i.e. suitable interface for a generator rated for 83.3 rpm at 50 Hz or 100 rpm at 60 Hz. The power grid interface transformer 12 could for this case typically be 132/11 kV YNd or Dyn.

Note that the present standard range of the embodiment shown in FIGS. 5*a* and 5*b* includes voltages up to 13.8 kV, suitable to interface a generator drive with around 60-72 poles bringing the rotor speed down to 83.33 rpm at 50 Hz and this is probably no technical limit.

144 poles or 72 pole-pairs give 72 separate three-phase stator windings that if interconnected in pairs are suitable for a 11000-13800 volt Perfect Harmony topology structure, as shown in FIG. 5*e* (power-cell topology similar to the 72 poled drive in FIG. 5*d*), i.e. suitable interface for a generator rated for 41.7 rpm at 50 Hz or 50 rpm at 60 Hz. A similar generator could typically be suitable for variable speed operation around 12 and 25 rpm in the 15 to 30 Hz range. The power grid interface transformer 12 could for this case typically be 132/11 kV YNd or Dyn.

The 144 poled wind turbine drive has been used as a typical to show some of the possible interconnections for the stator winding sets that can suit various purposes. FIG. 5*f* show Y-Y series connected pairs of stator windings that easily can be rearranged to Z-configurations without influencing the frequency converter interface.

FIG. 5*f* show D-Y series connected pairs of stator windings that also match a similar frequency converter interface.

Further FIG. 5*h* show typical stator winding identification numbering for a section of a 144 poled wind turbine drive. The various stator winding sets of a 144-poled generator can be identified as follows: U1 V1 W1, U2 V2 W2, U3 V3 W3, . . . , U71 V71 W71, U72 V72 W72.

Typically U71 V71 W71 interact with one rotor magnet with one north and one south pole through a given period and these three single phases could if they have the same phase shift be paralleled with U72 V72 W72 that through the same period interact with an other rotor magnet.

A wind turbine drive with 288 poles or 144 pole-pairs that give 144 separate three-phase stator windings that if interconnected in groups of four are suitable for a 11000-13800 volt Perfect Harmony topology structure, (power-cell topology similar to the 72 and 144 poled drives shown in FIGS. 5*d* and 5*e*), i.e. suitable interface for a generator rated for 20.8 rpm at 50 Hz or 25 rpm at 60 Hz. The power grid interface transformer 12 could for this case typically be 132/11 kV YNd or Dyn.

Similarly a generator with 432 poles constructed with groups of 6 paralleled and/or series connected 3-phase stator winding sets would match the same frequency converter interface as a 72-poled generator with 36 separate 3-phase stator winding sets. A generator with 432 poles has at 50 Hz 13.9 rpm that could be suitable for a large wind turbine drive where the nominal rating could be referred to 22.2 rpm and 80 Hz, i.e. something that should be weight saving for the generator and the total nacelle installation.

FIG. 6 shows another alternative embodiment of the system according to the present invention. As discussed above, a multi pole generator 5 (12, 18, 24, . . . , 432-poled generator) built to have has six galvanic segregated stator winding groups with the rotor side 18 connected to the rotating hub 2 and the stator side 19 connected to the power converter. The stator winding groups feed induced current to a power converter topology through galvanic isolated three-phase cables 11. Each of these three-phase cables 11 feed one power cell 8 which generates one-phase AC. The "power cell 8" in the embodiment shown simplified in FIG. 6 comprises a diode rectifier 6, a DC-link capacitor 16 and inverter 7. The "power cells 8" are arranged in columns and coupled in cascading order to add the voltage. These added voltages provide both redundancy, as described by the suppliers, and a higher output voltage, which implies higher currents and increased efficiency of the whole system.

A 12-pulse or higher rectification topology has advantages since the use of a diode bridge rectifier will cause harmonics on the stator current waveform. The stator windings can be arranged in a combination of D, Y and various other winding connections. For a 12-pole generator it could typically be 3 of delta and 3 of star connected stator windings if required to facilitate 12-pulse rectification and hence limit the magnetic fields of the higher harmonics, i.e. limit the eddy current losses in the rotor and reduce the risk of demagnetising the permanent magnets at a relatively small load if the rotor design does not include "damper windings" of any kind.

For a permanent magnet generator the value of the DC link voltage would normally be directly related to the shaft speed, unless a controlled rectifier is used. Controlled rectifiers may control the stator current to be sinusoidal and influence the amplitude of the generator output voltage by reactive power control to match the grid voltage partially independent from the shaft speed, i.e. wind turbine speed.

As for FIG. 5*a*, the alternative embodiment given in FIG. 6, the generator has 12 poles, however the generator may have an arbitrary even number of poles p corresponding to p/2 sets of three-phase windings, each feeding a power cell 8 through a galvanic isolated three-phase cable 11.

A practical limitation in pole numbers for the embodiments shown in both FIGS. 5 and 6, for a wind turbine generator drive could be in the 200 to 400 poles range, i.e. up to approximate 200 pole pairs for very large wind turbine drives, since 200 pole pairs and 15 rpm give 50 Hz generator output, resulting in approximately 94 m/s wing tip speed for 60 m turbine blades. On the other hand higher pole numbers combined with similar speeds will yield a higher terminal frequency from the generator that could reduce the generator weight and size.

Conventional wind turbines have a gearbox located in the nacelle 3. However, a wind turbine comprising the system according to the present invention can operate without a gearbox. This reduces the weight of the nacelle 3 and removes a component which is prone to wear and corrosion. If a wind turbine generator 5 drive rated in the MW range should operate without a gearbox then it would be beneficial to select a generator 5 with 24 to 30 poles or more. For a 5 MW wind turbine drive without a gearbox it is assumed that a generator 5 with around 50-70 pole-pairs could be competitive in association with a frequency converter 25. If this amount of poles should prove unpractical, the inventive solution could be combined with prior art by introducing a single stage planetary gear. The resulting solution is still by far more robust, lighter and requires less maintenance than for example the Vestas solution for their 3 MW V90 mill, which has three stages of planetary gears and one stage helical.

A 48-pole generator 5 where the stator windings are interconnected in groups of 4 can use the same Variable Frequency Drive topology as a 12-pole synchronous generator 5. Similarly a 144-pole generator 5 where the stator windings are interconnected in groups of 4 can use the same Variable Frequency Drive topology as a 36-pole synchronous generator 5. Similarly a 144-pole generator 5 where the stator windings are interconnected in groups of 2 can use the same Variable Frequency Drive topology as a 72-pole synchronous generator 5, as shown in FIG. 5e. Please note that two paralleled three-phase Y or Z connected stator windings are suitable for direct water cooling through their two neutral starpoints.

With the system according to the present invention, a typical multi-pole generator terminal voltage around the 400-2000 V range could then add-up in a frequency converter 25 to a output around the 4-13 kV range or higher and then enable a further single step transformer installations with standard winding ratios to voltage levels around 22-132 kV.

Figure 7:
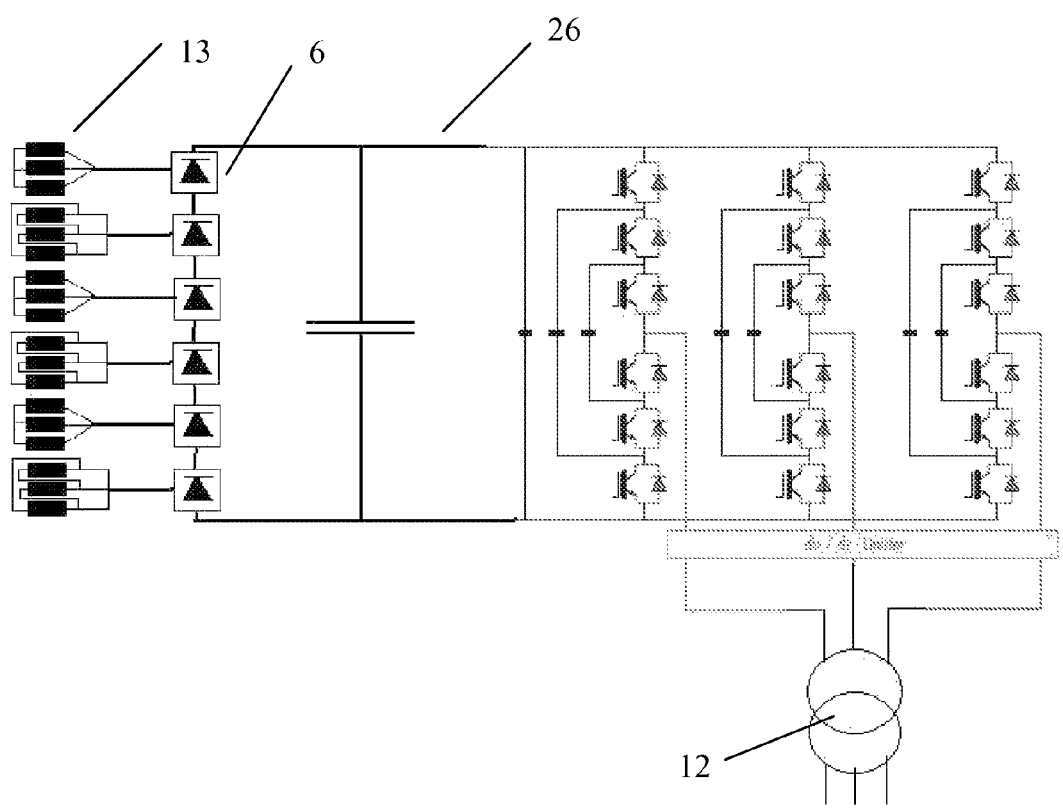
FIG. 7 illustrates a third alternative embodiment of the system (where the generator has 12 poles) according to the present invention.
Figure 8:
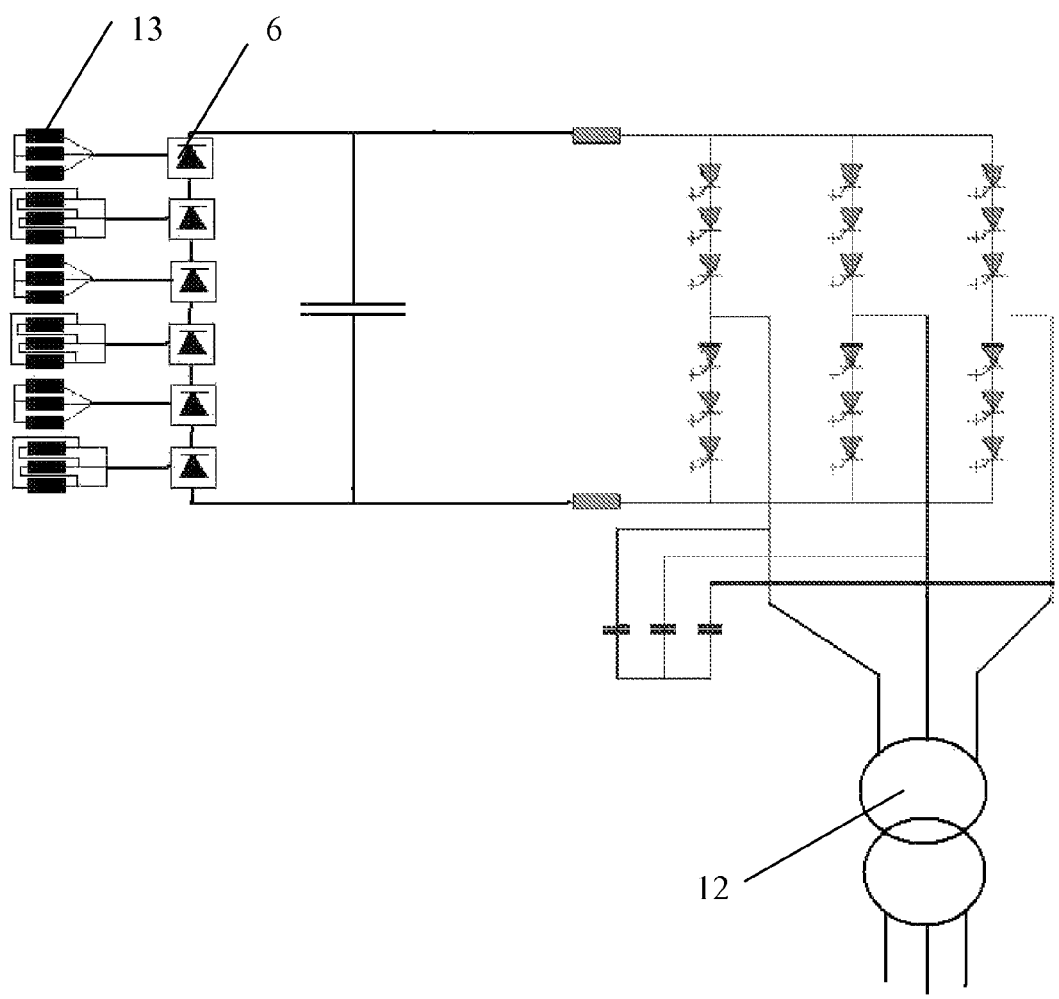
FIG. 8 illustrates a fourth alternative embodiment of the system (where the generator has 12 poles) according to the present invention.

FIGS. 7 and 8 shows a third and fourth embodiment of the invention using the multi-level inverters vdm and cdm from Alstom. FIG. 7 shows the invention with the vdm multi-level inverter and FIG. 8 shows the cdm multi-level inverter.

In conventional wind turbines, a transformer is located in the back of the nacelle 3, which will not be needed with a system according to the present invention. This "transformer space" could be used by a frequency converter installation, according to the present invention, instead suited to interface a multi-pole generator preferably without a gearbox. In addition, the transformer located before the optional slip rings in a wind turbine can be eliminated by using the system according to the present invention. By having a gearless system, the amount of maintenance will decrease. At any rate, the voltage provided by the inventive solution is high enough to move the first step up transformer down closer to ground or sea level with or without an ac-power swivel. This is a key advantage of the inventive drive train.

The space and weight capability requirements for the nacelle 3, might be reduced further by adding up the dc-voltages from the rectifiers connected to each of the 3-phase stator winding, in order to build up a dc-voltage level suitable to be transferred through a dc-power swivel if required to an inverter located some where further down in the tower structure or more remote. This approach could also be used to directly interface a multi terminal HVDC system, especially if multi poled generators based on Powerformer technology are included in the system design. One half of the turbine drives in a park could then if desired be connected between "+" and "0" with the other half of the turbine drives connected between "−" and "0", in order to form a bipolar dc-power system interface.

Figure 10:
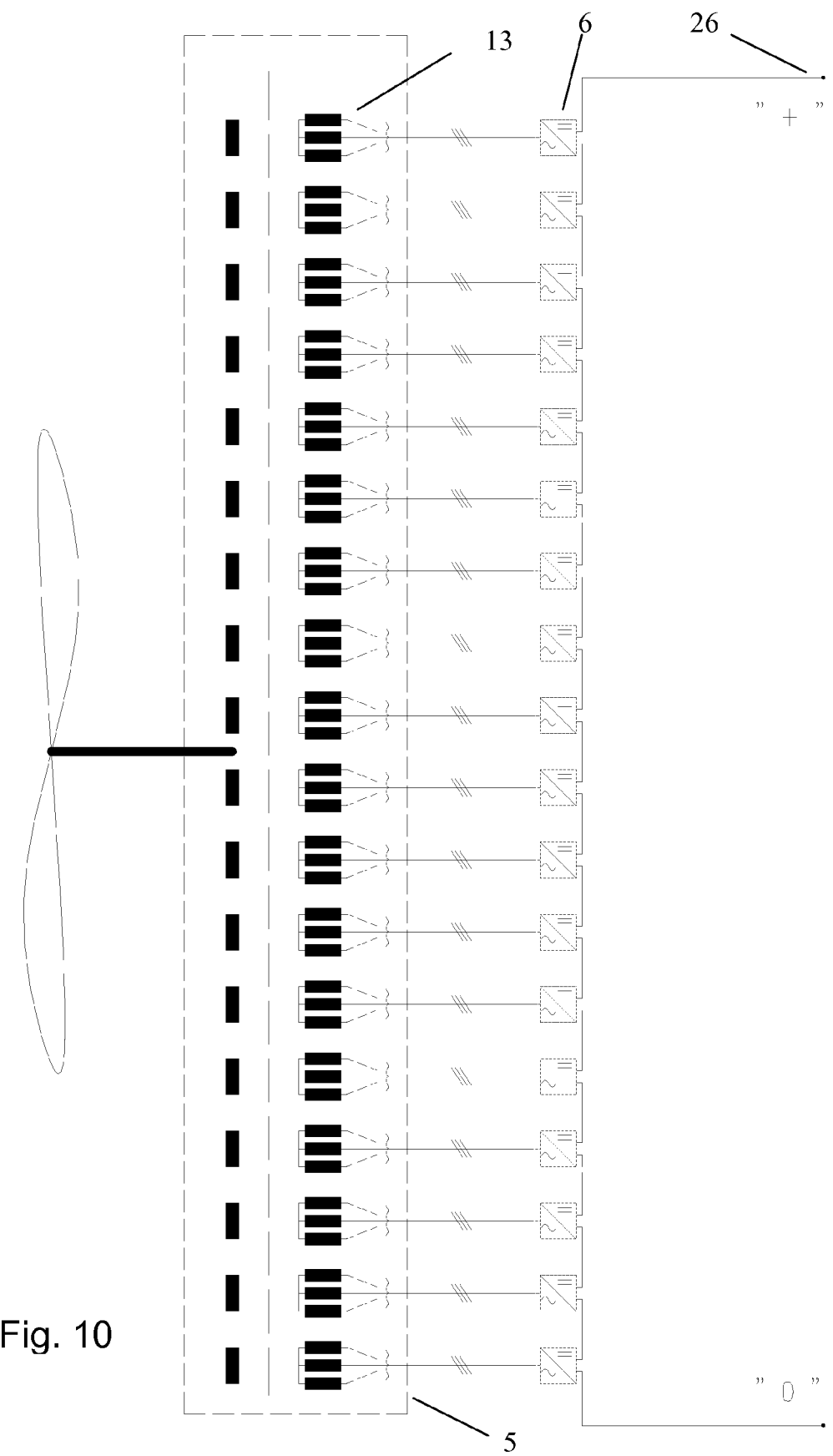
FIG. 10 illustrates a fifth alternative embodiment of the system suited for any dc interface, i.e. an interface to a suitable inverter or a HVDC system

FIG. 10 shows an embodiment of the invention where the currents from each stator winding set is rectified by series connected (typically six pulse) rectifier bridges with a mill connected between "+" and "0".

Figure 11:
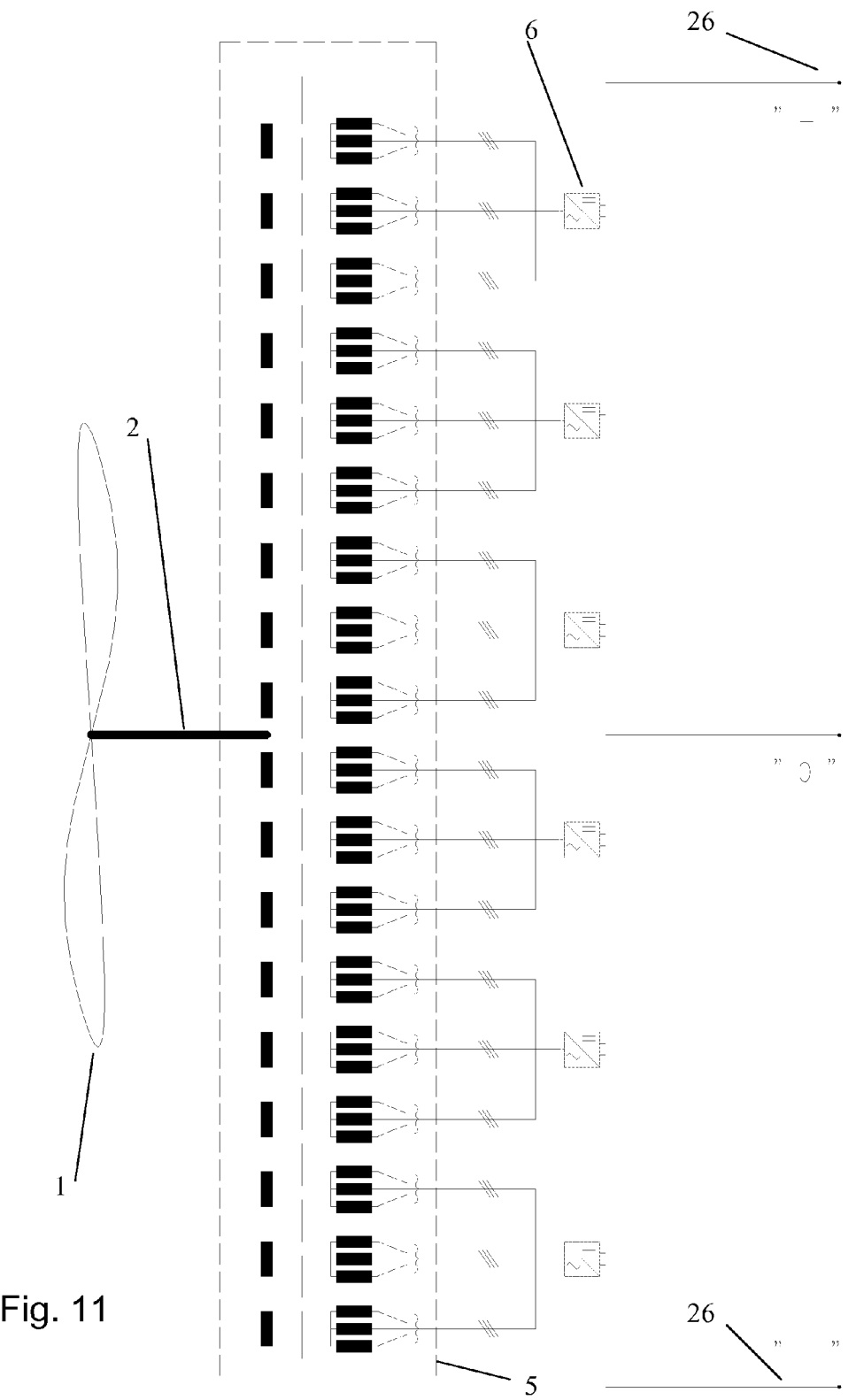
FIG. 11 illustrates a sixth alternative embodiment of the system suited for any dc interface, i.e. an interface to a suitable inverter or a HVDC system

FIG. 11 shows an embodiment of the invention where some stator-winding sets are coupled in parallel in order to match the current capacity of each semiconductor module in a bipolar dc-power system interface.

Figure 12:
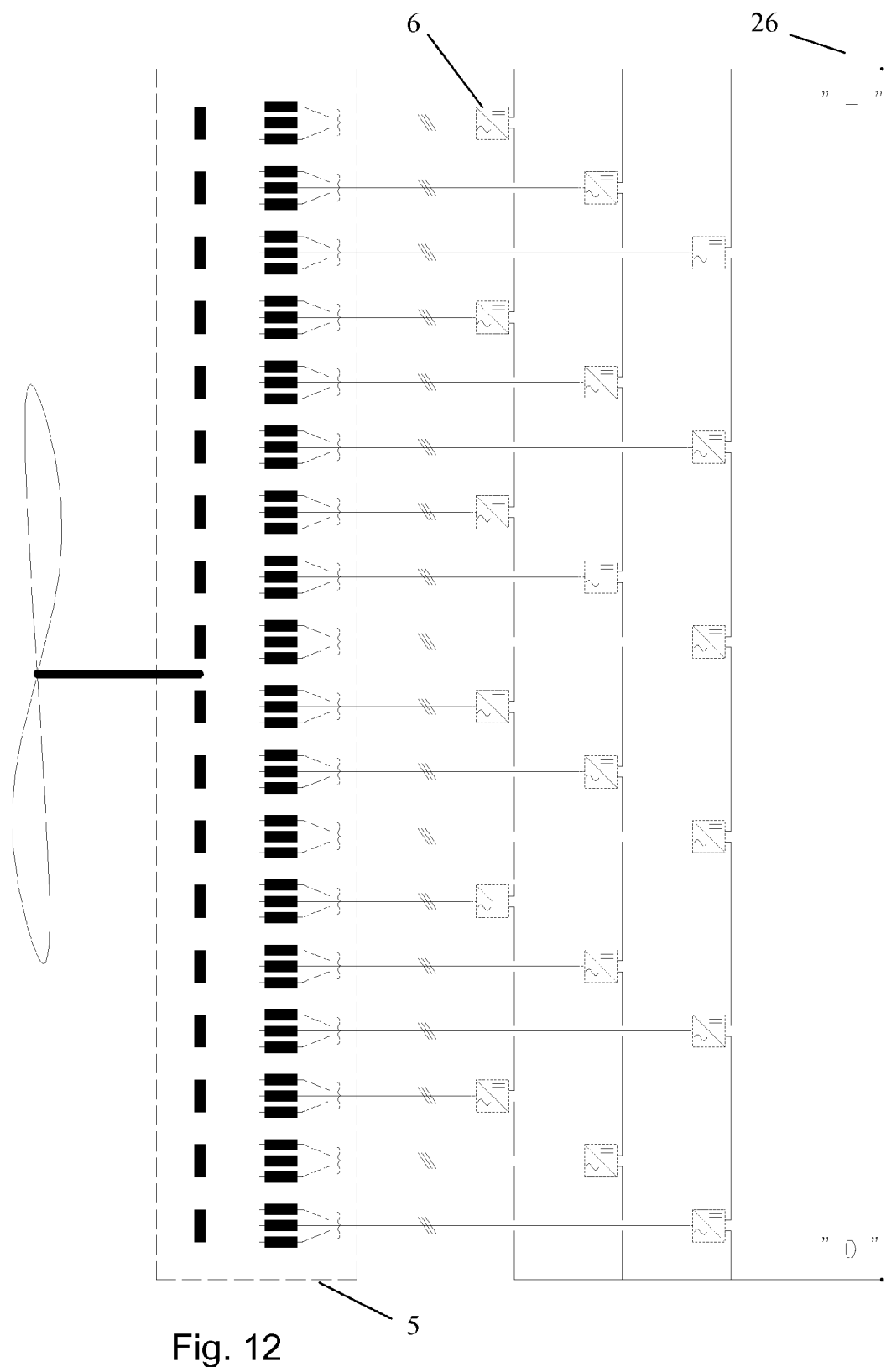
FIG. 12 illustrates a seventh alternative embodiment of the system suited for any dc interface, i.e. an interface to a suitable inverter or a HVDC system
Figure 13:
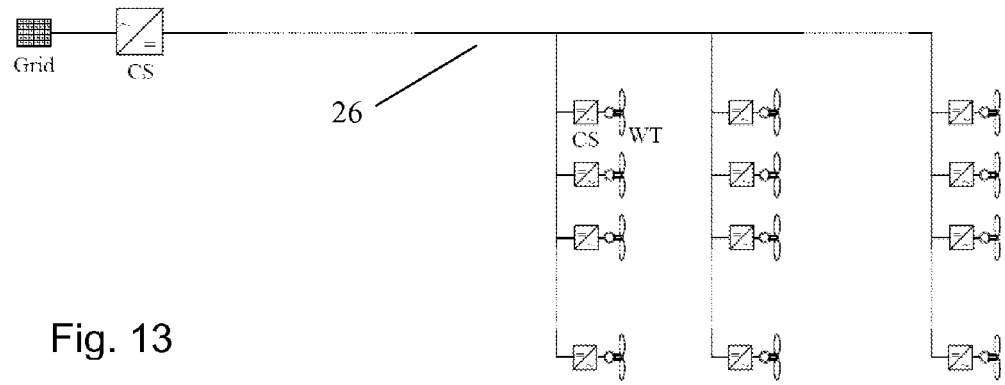
FIG. 13 illustrates prior art individual connection of wind turbines to a multi-terminal HVDC power system. ISBN 87-550-2745-8 Risø-R-1205(EN)
Figure 14:
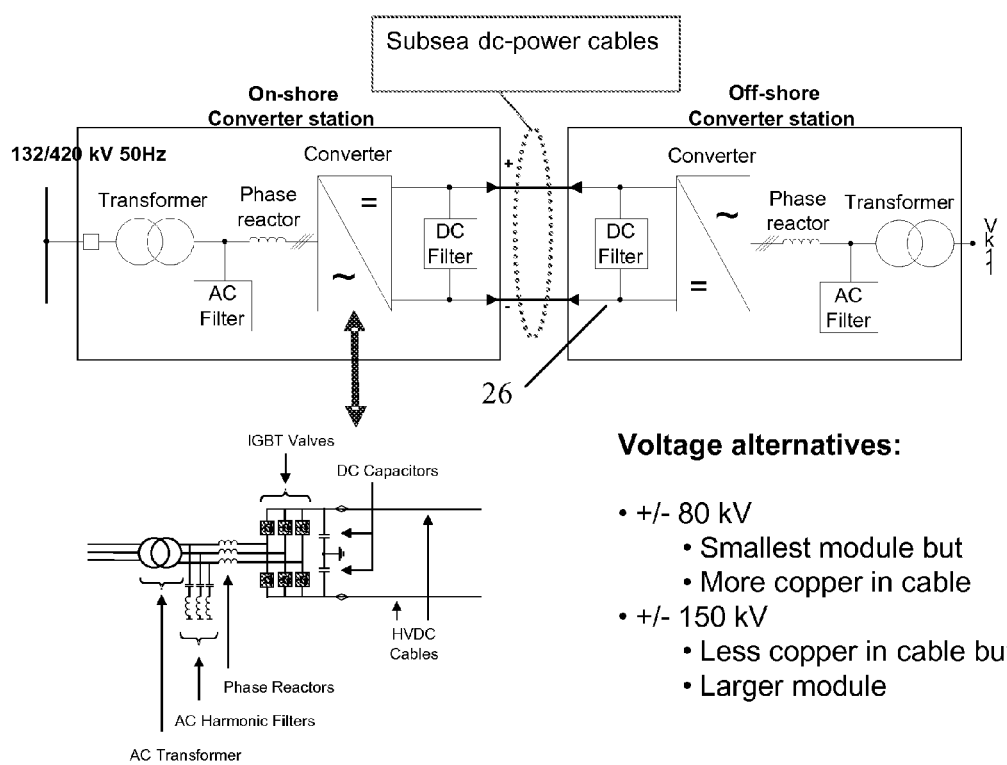
FIG. 14 illustrates prior art HVDC system topology and information by ABB
Figure 16:
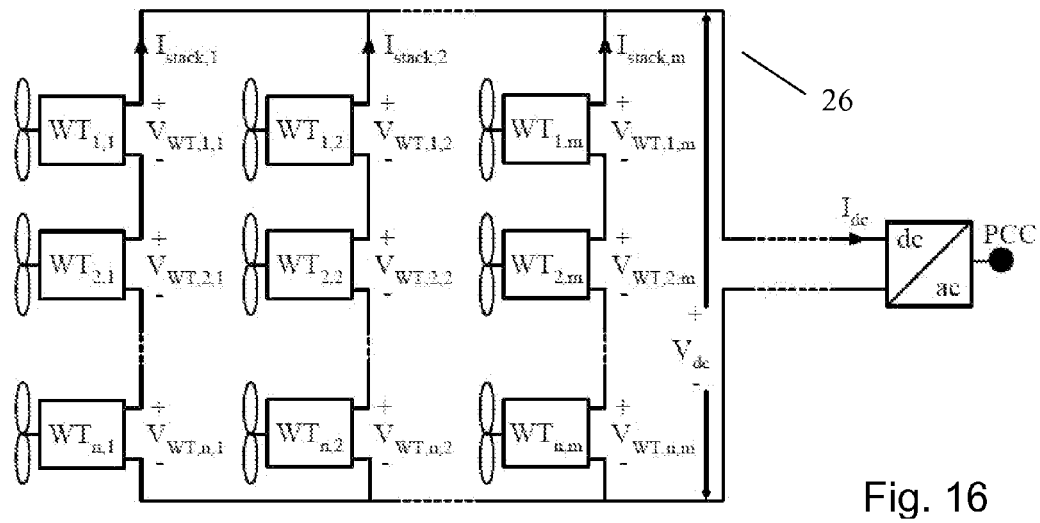
FIG. 16 illustrates prior art individual connection of wind turbines to a HVDC power system.

FIG. 12 shows an embodiment of the invention where some rectifiers are coupled in parallel in order to curb the current loading of each semiconductor module. Further, the embodiment illustrated in FIGS. 10, 11 and 12 could facilitate dc series or parallel connection of wind turbine drives. Such a wind park is illustrated in FIG. 13 or 16.

Figure 17:
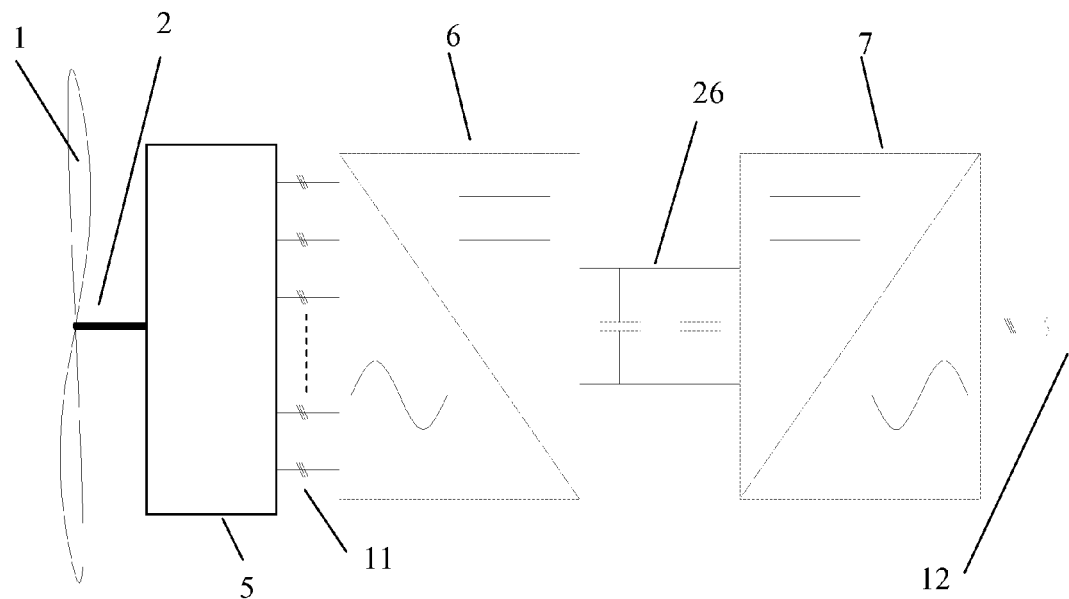
FIG. 17 is an alternative schematic view of the system according to the present invention.

A more schematic overview of a multi-pole synchronous generator interfacing a common intermediate dc-voltage level 26 is shown in FIG. 17.

As known to a person skilled in the art, a problem with wind parks today is that they are reliant on an existing power grid in order to start. This is because conventional wind mills, of different types, are often run in what is called regenerative breaking mode. In regenerative breaking mode a full bridge switching power supply is placed between the grid and the generator with its controlled frequency side facing the generator. As the wind move the turbine blades, the generator and rotates with a speed corresponding to the frequency output of the switching power supply. When the blades are pitched in order to produce additional torque, the turbine blades accelerate the generator and the switching power supply breaks the generator. The breaking energy is transferred via the full bridge switching power supply where it is rectified and fed to the grid through a simple uncontrolled inverter. It is then obvious to those skilled in the art that if the power grid is down, there is no dc-link between the grid and the switching power supply, hence there can be no controlled frequency AC side to break the generator electrically. The turbine will race or, preferably, be brought to a controlled halt by pitching the blades and applying a mechanical break.

Figure 9:
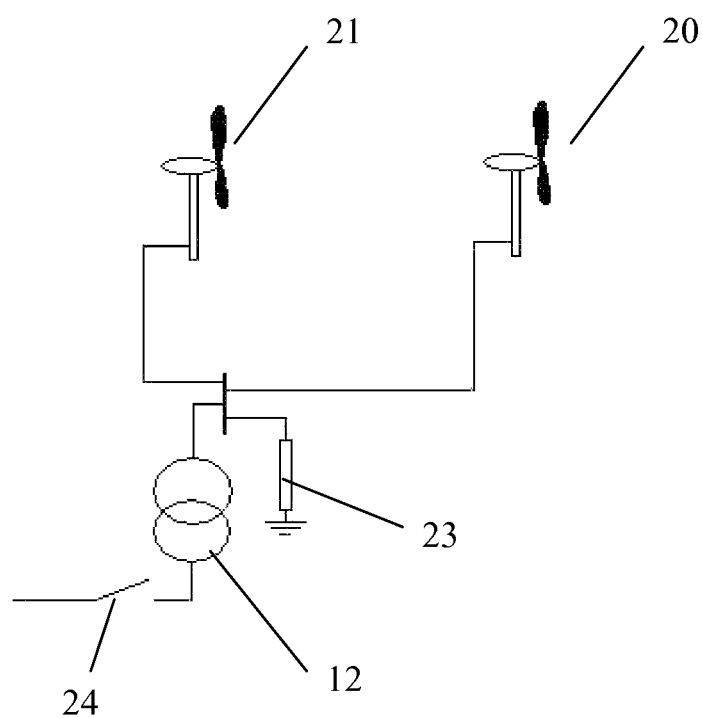
FIG. 9 illustrates a wind park comprising one self starting and one non-self starting wind mill.

If, however, one or more of the wind mills in the park is of the type according to the present invention, the following procedure may be used to black start the wind park comprising several conventional wind mills. The black start of a conventional wind mill will vary, depending on the design of the wind mill. Regardless of design, all conventional wind mills need a local power grid with voltage to be able to start. The reason for the need for this grid varies, dependent on the wind mill design. The conventional, non self-starting wind turbines 21 use, in an arbitrary manner, the local grid voltage provided by the self-starting wind turbines 20 according to the present invention. FIG. 9 shows a simple case of a wind park comprising two wind mills 20, 21. This illustrates the difference between the local power grid and the regional power grid. A local load 23 is located on the wind mill side of the transformer 22, and a circuit breaker 24 is located on the net side of the transformer 22. The wind mill according to the present invention, comprising a switching power supply with its controlled AC side facing the grid, may start by removing mechanical brakes and controlling blade pitch with UPS (Uninterruptible Power Supply) emergency power. In the event that the mill comprises an externally exited synchronous generator, this may also be energized by UPS emergency power. As the turbine, and hence the generator, picks up speed, voltage is induced to feed the switching power supply. This frequency converter 25 may then build a weak but sufficient local grid at the islanded wind park. As the voltage from the wind mill according to the present invention builds, conventional wind mills may be started one at a time. These conventional wind mills will then contribute to the local grid after being started. During this black start, a local load or a resistor bank/electrode-boiler would be needed in order to dump excess power and deliver the needed breaking torque for the self starting wind mills when pitch control are insufficient.

The frequency converter system can be equipped with a voltage limiter unit(s) or break chopper(s) as suitable for the various topology structures. These dc-break chopper(s) can dissipate the active power from the turbine during various grid faults if installed.

Segregated Phase Input to Converter.

Figure 18A:
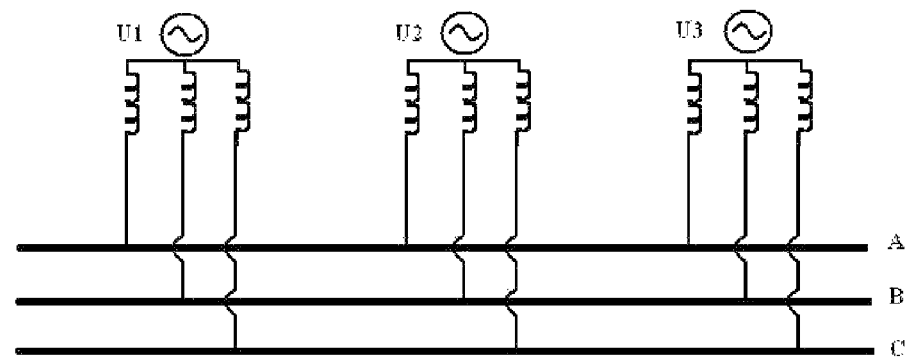
FIG. 18a-c illustrated the iput according to the known art (18a) and the segtregated phase input to the converter according to the invention.

If one assumes a segmented generator stator, such as discussed in WO 00/60719 and illustrated in FIG. 18a, with each stator segment producing at least one galvanic isolated three-phase output, gathering all outputs to a common three-phase "bus" entails that each output can not be phase shifted from each other. In FIG. 18a, assuming a generator with three segments and one output from each, it means that U1, U2 and U3 must be in phase. If they are not, circulating currents will occur between the circuits and cause losses.

Figure 18B:
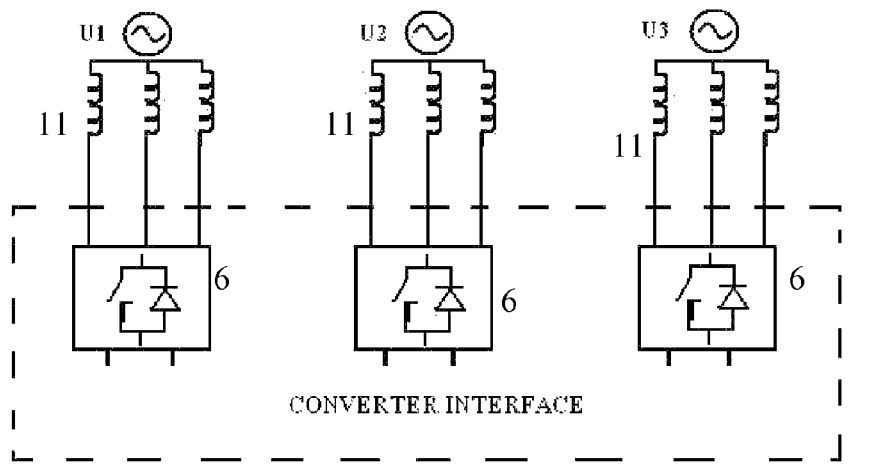

In the present invention the outputs of the respective segments are fed to separate inputs through separate cables 11 of a multilevel converter and rectified independently by rectifiers 6 as illustrated in FIG. 18b. In this case the phase shift of the voltages U1, U2 and U3 are not potentially harmful. In fact proper phase shifting with rectification can help cancel harmonics in the generator, reducing losses and need for insulation. This also gives more freedom when establishing stator windings. For example the generator can be split in nine segments with each output phase shifted 360/9=40° from each other. FIG. 18b shows a schematic converter interface, indicating independent rectification. If several three-phase outputs are provided, then each converter level can be interconnected with a set of electrically insulated phase terminals dedicated to each level in a multilevel frequency converter topology.

This will enable the build-up of a higher converter output voltage compared to the generated line-to-line input voltage without to high common mode voltages stressing the stator winding insulation.

Figure 18C:
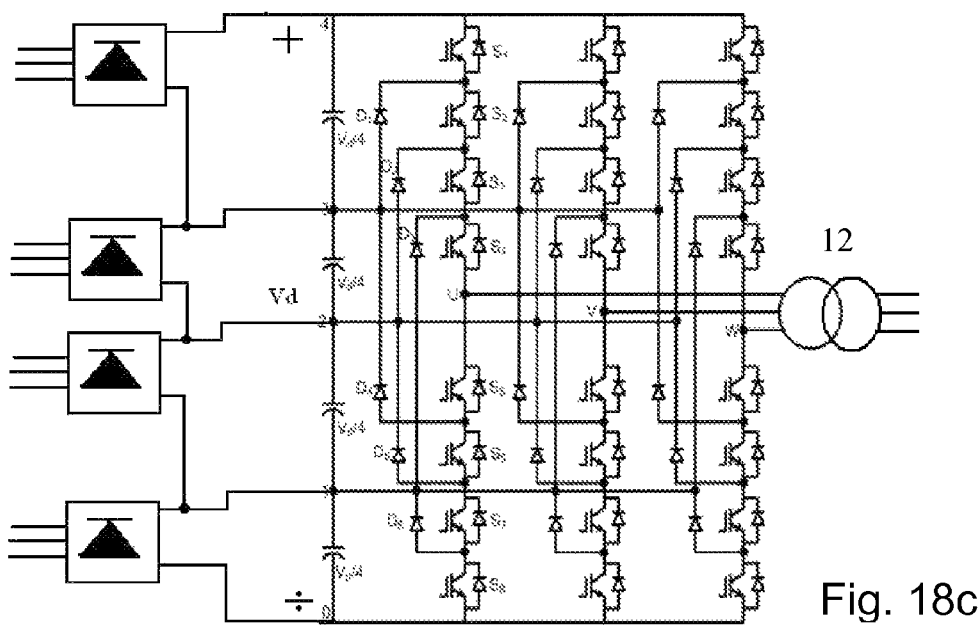

According to one embodiment of the invention illustrated in FIG. 18c the invention may use currents from the various electrically insulated stator winding groups to control the charge balance between the various capacitor groups in a multilevel frequency converter.

In the schematic in FIG. 18c, a multilevel NPC-is shown to interface insulated three-phase generator outputs. Instead of feeding the rectified voltage $V_d$ to the terminals of the NPC converter, $V_d/4$ is supplied to the capacitors. This ensures balanced capacitor voltages.

Summarized, the system according to the present invention facilitate large multi pole generators in wind turbines, in order to increase the power of the wind turbine and reduce the rotational speed without, or minimizing the use of, gear transmissions. The present invention uses a multi pole synchronous generator 5 characterized in that its stator windings are isolated from each other, together with a frequency converter topology that increases output voltage by adding up voltages from the galvanic isolated stator windings. Thus, the power transformer usually located in the nacelle 3 may be disregarded, freeing up both room and weight and thus facilitating the large multi pole generator needed in a directly driven wind turbine or wind mill. The present invention can be used in several types of turbines, for example wind turbines, tidal generators etc.

REFERENCE NUMERALS

1. Turbine blade
2. Rotating hub
3. Nacelle
4. Tower
5. Generator
6. Rectifier/Converter
7. Inverter/Converter
8. Power cell
9. Synchronous- or asynchronous machine
10. Isolation transformer
11. Galvanic isolated three-phase cables
12. Power grid interface transformer
13. Three-phase generator windings
14. Power grid
15. Input transformer
16. Capacitor
17. Control
18. Rotor
19. Stator
20. Self-starting wind mill
21. Non self-starting wind mill
22. Transformer
23. Local load
24. Circuit breaker
25. Frequency converter
26. Intermediate dc-voltage level
M. Motor

The invention claimed is:
1. A system comprising:
a variable speed turbine that comprises at least one turbine blade connected to a rotating hub;
a multi pole synchronous generator driven by said rotating;
a multi level frequency converter connected to said multi pole synchronous generator via a plurality of galvanic isolated three phase cable, wherein the multi pole synchronous generator is arranged to feed current to the multi level frequency converter through the plurality of galvanic isolated three-phase cables and wherein the multi level frequency converter comprises a plurality of elements arranged in columns and coupled in cascading order to add inverted voltage; and
a transformer connected to the multi level frequency converter and arranged to transform the added inverted voltage to a power grid level connected to a secondary side of the transformer, wherein the multi pole synchronous generator has at least 12 poles and galvanically isolated stator windings connected via the plurality of galvanic isolated three-phase cables to a multi level rectifier topology feeding an intermediate DC-voltage level as suited to interface an inverter of the multi level frequency converter feeding power out through the transformer.

2. The system according to claim 1, wherein the multi pole synchronous generator has rotor field windings or permanent magnets.

3. The system according to claim 1, wherein the system comprises a gear.

4. The system according to claim 1, wherein stator windings of the multi pole synchronous generator are arranged in a combination of at least two of D, Y and Z variations.

5. The system according to claim 1, wherein the system comprises at least one additional turbine.

6. The system according to claim 1, wherein the transformer is selected from the group consisting of a standard transformer and a rotating transformer.

7. The system according to claim 1, wherein the multi pole synchronous generator comprises multiple electrical machines driven by a multi shaft gear solution or mounted on a common shaft.

8. The system according to claim 1, wherein the multi pole synchronous generator has a number of galvanic isolated three-phase cables is p/2 or less, where p represents said number of poles.

9. The system according to claim 1, wherein the intermediate dc-voltage level is a common intermediate dc-voltage level, and said inverter is a remotely located inverter.

10. The system according to claim 1, further comprising:
a self-starting wind turbine coupled to said variable speed turbine, wherein the variable speed turbine is a non-self starting turbine, and the at least one self-starting wind turbine is arranged to start the at least one non-self starting wind turbines by having an AC side towards the power grid level.

11. The system according to claim 1, wherein the system is gearless.

12. A method for conditioning power, the method comprising:
driving a multi pole synchronous generator with a variable speed turbine, wherein the multi pole synchronous generator has at least 12 poles and galvanically isolated stator windings;
feeding current from said multi pole synchronous generator to a multi level frequency converter through a plurality of galvanic isolated three-phase cables, wherein the multi level frequency converter comprises a plurality of elements arranged in columns and coupled in cascading order to add inverted voltage; and
feeding an intermediate DC-voltage level as suited to interface an inverter of the multi level frequency converter; and
transferring said inverted voltage received by a transformer connected to the multi level frequency converter to a power grid level connected to a secondary side of the transformer.

13. The method according to claim 12, wherein the variable speed turbine comprises a gear or is a gearless turbine.

14. The method according to claim 12, wherein stator windings of the multi pole synchronous generator are arranged in a combination of at least two of D, Y and Z variations.

15. The method according to claim 12, wherein the transformer is selected from the group consisting of a standard transformer and a rotating transformer.

16. The method according to claim 12, wherein at least one additional turbine is coupled to said variable speed turbine.

17. The method according to claim 12, wherein the multi pole synchronous generator comprises multiple electrical machines driven by a multi shaft gear solution or mounted on a common shaft.

18. The method according to claim 12, wherein the multi pole synchronous generator has at least 12 and a number of galvanic isolated three-phase cables is p/2 or less, where p represents said number of poles.

19. The method according to claim 12, wherein the intermediate dc-voltage level is a common intermediate dc-voltage level, and said inverter is a remotely located inverter.

20. The method according to claim 12, further comprising:
arranging a self-starting turbine with an AC side toward a power grid level, wherein said self-starting wind turbine is coupled to said variable speed turbine, and the self-starting wind turbine is arranged to start the variable speed turbine.

* * * * *